US012186148B2

(12) United States Patent
Taylor et al.

(10) Patent No.: US 12,186,148 B2
(45) Date of Patent: Jan. 7, 2025

(54) ORAL HEALTH DEVICE FOR SIMULTANEOUSLY BRUSHING THE SURFACES OF AND CLEANING THE INTERPROXIMAL SPACES BETWEEN A USER'S TEETH

(71) Applicant: Fresh Health Inc., Mountain View, CA (US)

(72) Inventors: Machiko Taylor, Alameda, CA (US); Madison Mount, Oakland, CA (US); Bruce Michael Schena, Menlo Park, CA (US)

(73) Assignee: Fresh Health Inc., Mountain View, CA (US)

( * ) Notice: Subject to any disclaimer, the term of this patent is extended or adjusted under 35 U.S.C. 154(b) by 0 days.

(21) Appl. No.: 18/514,229

(22) Filed: Nov. 20, 2023

(65) Prior Publication Data

US 2024/0197453 A1 Jun. 20, 2024

Related U.S. Application Data

(60) Provisional application No. 63/433,951, filed on Dec. 20, 2022.

(51) Int. Cl.
*A61C 17/22* (2006.01)
*A46B 9/02* (2006.01)
*A61C 17/02* (2006.01)
*A61C 17/38* (2006.01)

(52) U.S. Cl.
CPC ............ *A61C 17/228* (2013.01); *A46B 9/026* (2013.01); *A61C 17/0211* (2013.01); *A61C 17/38* (2013.01)

(58) Field of Classification Search
CPC ... A61C 17/228; A61C 17/38; A61C 17/0211; A46B 9/026
USPC ......................................................... 15/21.1
See application file for complete search history.

(56) References Cited

U.S. PATENT DOCUMENTS

| 3,840,992 | A | | 10/1974 | English | |
|---|---|---|---|---|---|
| 4,493,125 | A | * | 1/1985 | Collis | ...................... A46B 9/04 15/110 |
| 10,595,627 | B1 | | 3/2020 | Laurent | |
| 10,716,651 | B2 | | 7/2020 | Hyun | |
| 10,932,555 | B2 | | 3/2021 | De Gentile | |
| 11,622,751 | B2 | | 4/2023 | Fougere | |
| 2011/0087197 | A1 | | 4/2011 | Mombrinie | |
| 2012/0021375 | A1 | * | 1/2012 | Binner | ................... A61B 5/097 433/89 |
| 2013/0081217 | A1 | | 4/2013 | Jeong | |
| 2013/0165828 | A1 | | 6/2013 | Sullivan | |
| 2013/0260332 | A1 | | 10/2013 | Shapiro | |
| 2015/0282911 | A1 | * | 10/2015 | Steiner | ................. A61C 17/228 15/22.2 |
| 2017/0056144 | A1 | | 3/2017 | Levy | |
| 2018/0368957 | A1 | | 12/2018 | Hyun | |

(Continued)

*Primary Examiner* — Eric J Rosen
*Assistant Examiner* — Aaron R McConnell
(74) *Attorney, Agent, or Firm* — Van Pelt, Yi & James LLP

(57) ABSTRACT

An oral insert includes a plurality of bristles and a plurality of fluid nozzles. The plurality of bristles is located on an upper portion and a lower portion of a tray surface of the oral insert. The plurality of fluid nozzles is located at an inner portion and an outer portion of the tray surface. Fluid output by the plurality of fluid nozzles causes the plurality of bristles to contact surfaces of teeth associated with a user of the oral insert.

18 Claims, 20 Drawing Sheets

(56) References Cited

U.S. PATENT DOCUMENTS

2019/0000599 A1\* 1/2019 Hanuschik ............. A61C 17/16
2021/0085436 A1\* 3/2021 Evans ................ A61C 17/0202

\* cited by examiner

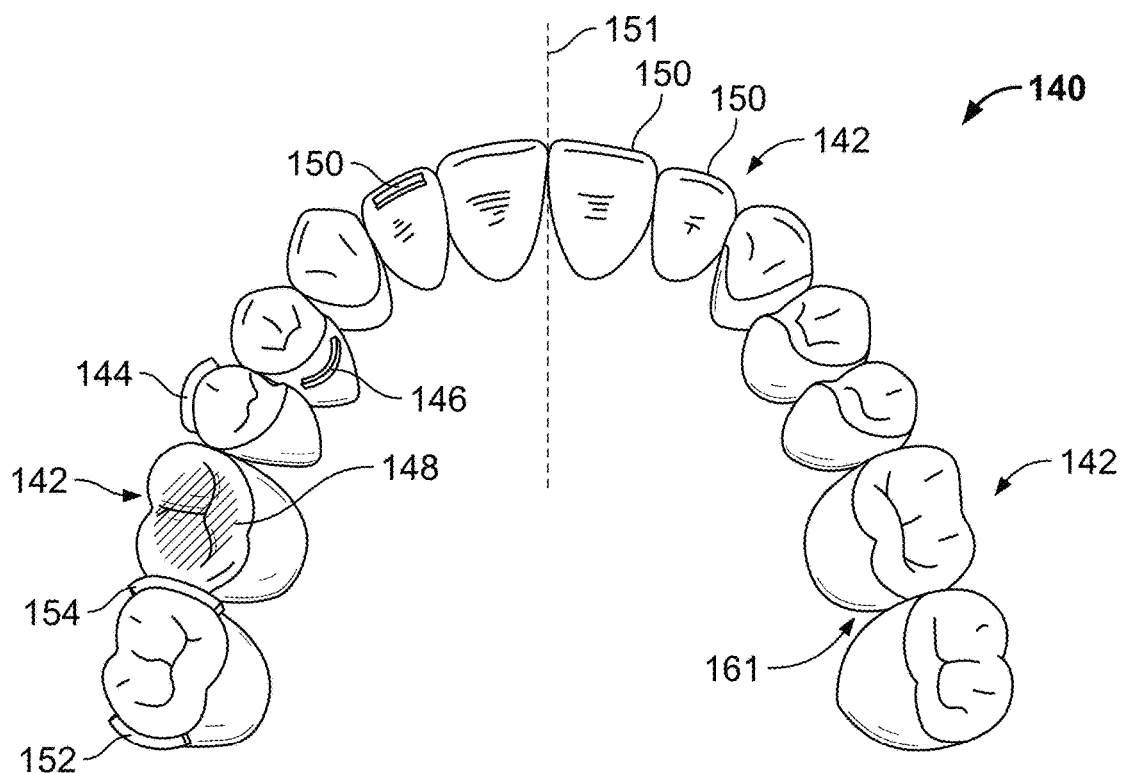
FIG. 1A
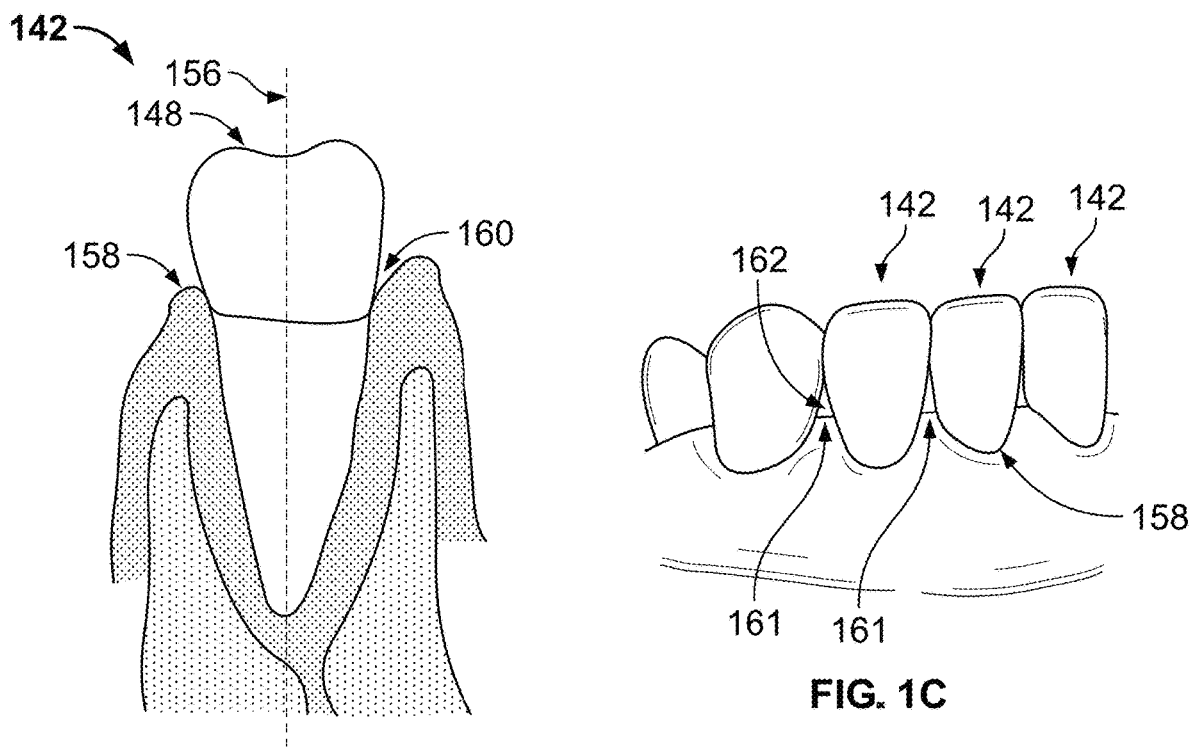
FIG. 1B
FIG. 1C

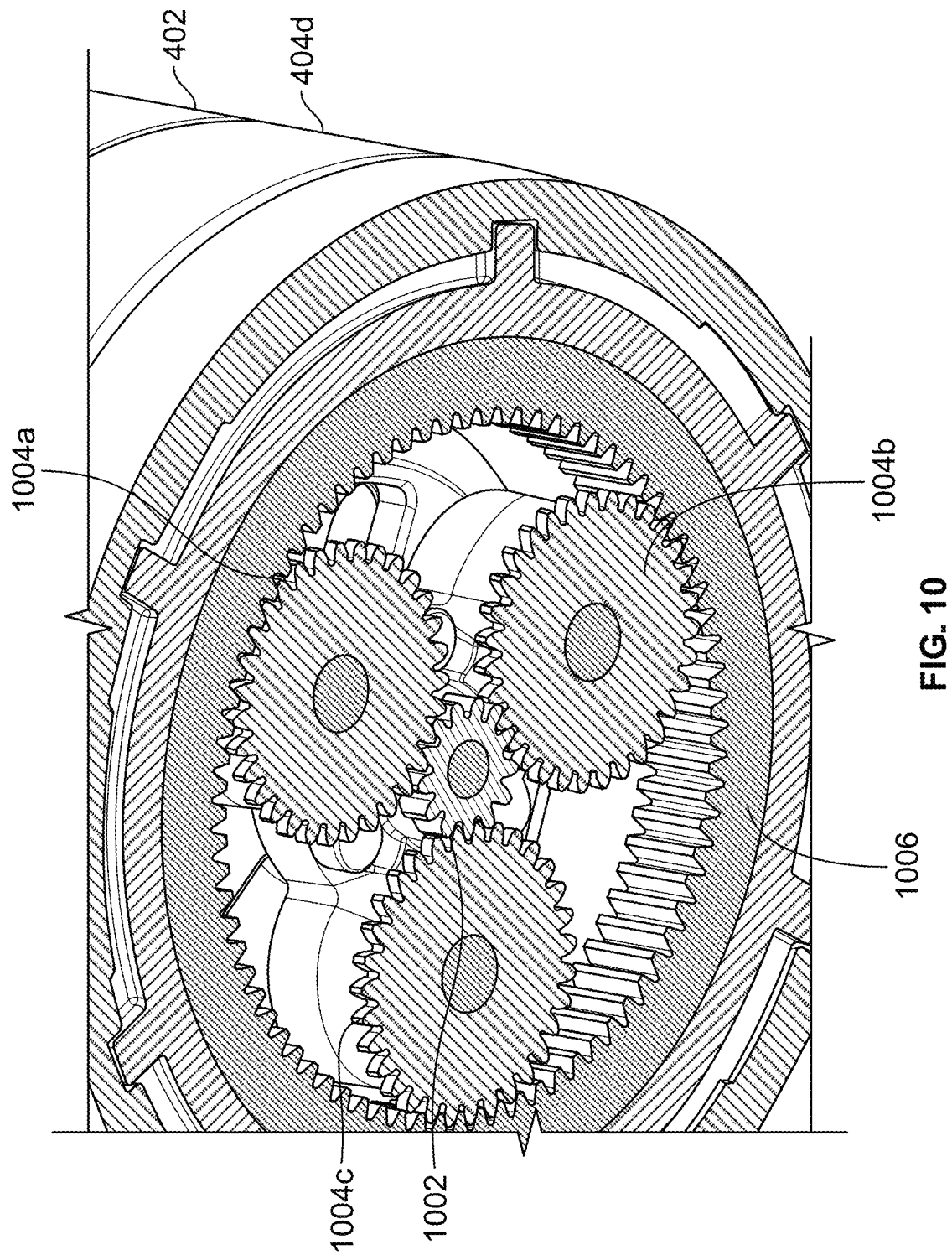

ORAL HEALTH DEVICE FOR SIMULTANEOUSLY BRUSHING THE SURFACES OF AND CLEANING THE INTERPROXIMAL SPACES BETWEEN A USER'S TEETH

CROSS REFERENCE TO OTHER APPLICATIONS

This application claims priority to U.S. Provisional Patent Application No. 63/433,951 entitled BRUSHING DEVICE FOR TEETH filed Dec. 20, 2022 which is incorporated herein by reference for all purposes.

BACKGROUND OF THE INVENTION

Dentists recommend that people brush their teeth for at least two minutes twice a day. Traditional toothbrushes may be used to clean the teeth of a user. When not used properly, traditional toothbrushes may be less effective at removing plaque and bacteria. One common problem with traditional toothbrushes is that the user may brush too hard, which will wear away the enamel of the teeth.

The user may opt for an electronic toothbrush. Most electronic toothbrushes come with a built-in timer that notifies the user of when the used needs to brush a different part of their mouth. For example, an electronic toothbrush may vibrate after 30 seconds of use. 60 seconds of use. 90 seconds of use, and 120 seconds of use. This may enable the user to perform a complete brushing of their teeth within the recommended two minutes.

However, many electronic toothbrush users still may not brush their teeth for the recommended two minutes even though an electronic toothbrush is more convenient to use than traditional toothbrushes because they are indolent, tired, or lack enough time to brush for the full two minutes. Regardless of which toothbrush they use, dentists still recommend that people brush their teeth for two minutes.

Dentists also recommend that people floss their teeth at least once a day. A proper flossing may require around 90 seconds. However, people may also not properly floss their teeth because they are indolent, tired, lack enough time, or even know how to properly floss their teeth.

In recent years, mouthpiece toothbrushes have been developed with promises of reducing the amount of time in a cleaning session from two minutes to anywhere from 10-45 seconds. A mouthpiece toothbrush is a device that includes a plurality of bristles. A user applies toothpaste to the surfaces of the bristles, inserts the mouthpiece toothbrush into their mouth, and turns on the mouthpiece toothbrush. There is no need to move the mouthpiece toothbrush like a manual toothbrush. In response to being turned on, the mouthpiece toothbrush vibrates.

Although mouthpiece toothbrushes may reduce the amount of time needed by a user to clean their teeth, a study by Nieri et al, entitled "Efficacy of a U-Shaped Automatic Electric Toothbrush in Dental Plaque Removal: A Cross-Over Randomized Controlled Trial" has shown that mouthpiece toothbrushes were not effective in removing dental plaque. Thus, users may be better off using traditional devices, i.e., manual or electric toothbrushes, to clean their teeth. Furthermore, users still need to separately floss their teeth to clean the interproximal spaces between their teeth.

BRIEF DESCRIPTION OF THE DRAWINGS

Various embodiments of the invention are disclosed in the following detailed description and the accompanying drawings.

FIGS. 1A-1C are schematic depictions of oral anatomy and dental structures, illustrating the regions of the oral cavity.

FIG. 10 is a diagram illustrating a fourth portion of the handle seal in accordance with some embodiments.

DETAILED DESCRIPTION

Figure 1D:
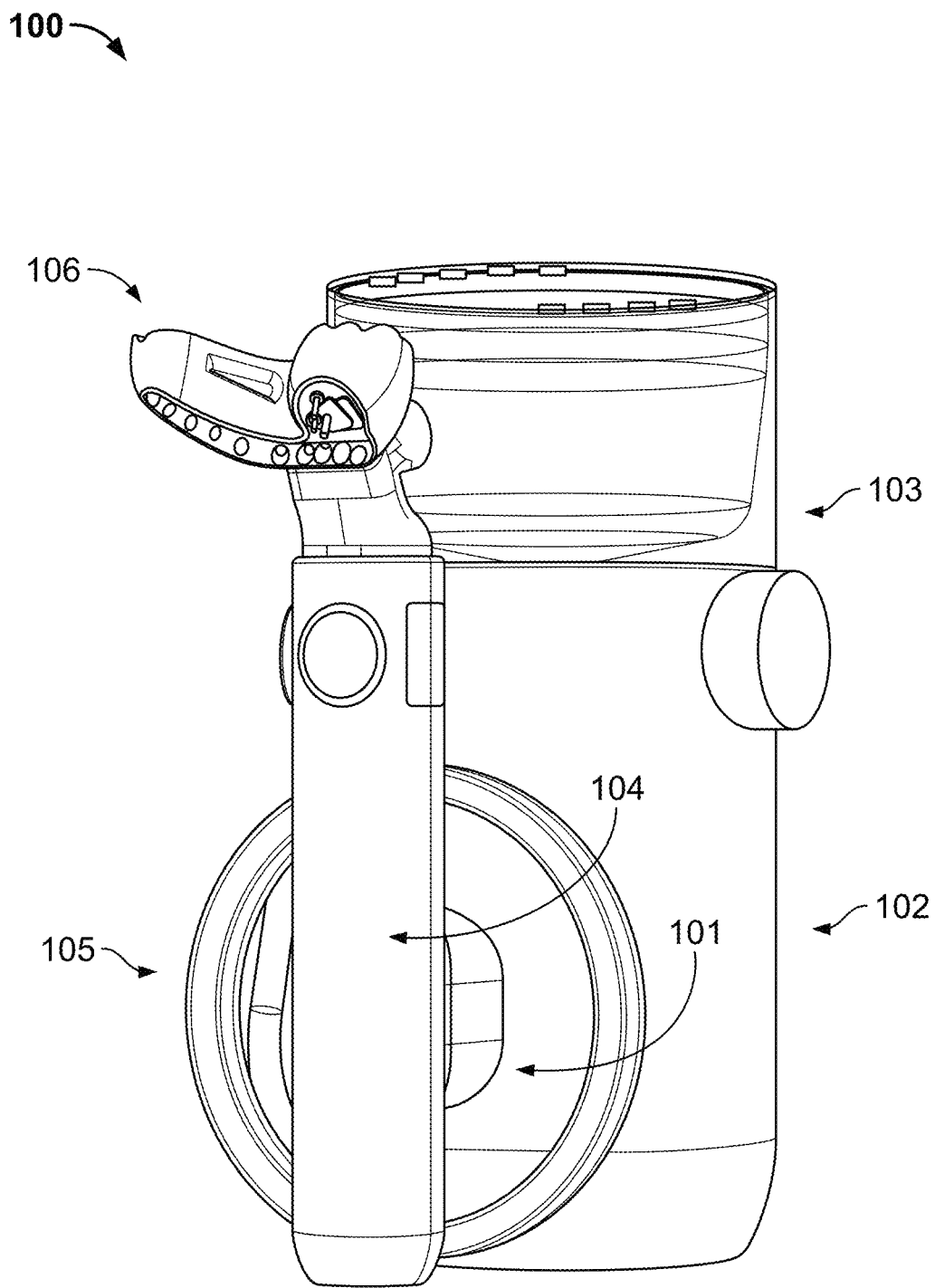
FIG. 1D illustrates an example of an oral care device in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment.

The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

An oral health device is disclosed. The oral health device is capable of simultaneously brushing the surfaces of and cleaning the interproximal spaces between a user's teeth. When compared with traditional methods, the oral health care device reduces the amount of time needed to clean the surfaces of and interproximal spaces between the user's teeth.

The oral health device may include a fluid reservoir, a pump, a handle, and an oral insert. The oral insert includes a plurality of manifolds, a plurality of fluid nozzles, and a plurality of bristles. A manifold may be associated with one or more fluid nozzles. In one embodiment, the oral insert includes eight manifolds, each manifold having eight fluid nozzles.

Fluid is introduced into the fluid reservoir. A user may insert the oral insert into their mouth and subsequently activate the oral health device. When the oral health device is activated, the pump causes fluid to exit the fluid reservoir and to be directed towards the oral anatomy of the user via the plurality of manifolds and the plurality of fluid nozzles. The plurality of fluid nozzles of the oral insert is directed towards interproximal spaces between the user's teeth. The fluid exiting the plurality of fluid nozzles has an associated pressure that is sufficient to clean the interproximal spaces between the user's teeth.

In some embodiments, the location of the plurality of fluid nozzles is customized to the user's oral anatomy. In some embodiments, the location of the plurality of fluid nozzles is standardized for different size oral inserts. For example, standard "small-sized" oral inserts, "medium-sized" oral inserts, "large-sized" oral inserts, and "extra-large-sized" oral inserts may be generated to reduce the costs with manufacturing the oral inserts. The location of the plurality of fluid nozzles for a "small-sized" oral insert is different than the location of the plurality of fluid nozzles for a "medium-sized" oral insert.

The oral insert is connected to the fluid reservoir via a handle. The handle includes a motor, a manifold selector disc, and a manifold disc. The motor causes the manifold selector disc to rotate. The manifold selector disc includes an opening that is selectively aligned with the manifold disc such that it exposes one of a plurality of holes associated with the manifold disc and covers the other holes associated with the manifold disc. Pressurized fluid is provided to the handle to the oral insert via the opening of the manifold selector disc and an exposed hole associated with the manifold disc. The pressurized fluid ultimately arrives at a plurality of fluid nozzles associated with the manifold that corresponds to the exposed hole.

The plurality of holes of the manifold disc are arranged in a circular pattern. Each of the plurality of holes is associated with a corresponding manifold of the oral insert of the oral health device. Each manifold of the oral insert is associated with a corresponding portion of the oral anatomy. For example, a first manifold may be associated with the exterior surfaces of teeth located in an upper left portion of a user's jaw, a second manifold may be associated with the interior surfaces of teeth located in an upper left portion of the user's jaw, a third manifold may be associated with the exterior surfaces of teeth located in an upper right portion of the user's jaw, a fourth manifold may be associated with the interior surfaces of teeth located in the upper right portion of the users jaw, a fifth manifold may be associated with the exterior surfaces of teeth located in a lower left portion of a user's jaw, a sixth manifold may be associated with the interior surfaces of teeth located in the lower left portion of the user's jaw, a seventh manifold may be associated with the exterior surfaces of teeth located in a lower right portion of the user's jaw, and an eighth manifold may be associated with the interior surfaces of teeth located in the lower right portion of the user's jaw.

The manner in which the holes of the manifold disc correspond to different surfaces of the user's jaw is selected to cause the oral insert to vibrate as the manifold selector disc rotates and pressurized fluid is provided to different surfaces of the user's jaw. The manifold disc selector rotates for a predetermined amount of time or until there is no more fluid in the fluid reservoir.

In some embodiments, the sequence of the holes of the manifold disc alternately correspond to different sides of the user's jaw. For example, a first hole may correspond to a manifold associated with the exterior surfaces of teeth located in an upper left portion of a user's jaw, a second hole may correspond to a manifold associated with the exterior surfaces of teeth located in an upper right portion of the user's jaw, a third hole may correspond to a manifold associated with the interior surfaces of teeth located in the upper left portion of the user's jaw, a fourth hole may correspond to a manifold associated with the interior surfaces of teeth located in the upper right portion of the user's jaw, a fifth hole may correspond to a manifold associated with the exterior surfaces of teeth located in a lower left portion of the user's jaw, a sixth hole may correspond to a manifold associated with the exterior surfaces of teeth located in a lower right portion of the user's jaw, a seventh hole may correspond to a manifold associated with the interior surfaces of teeth located in the lower left portion of the user's jaw, and an eighth hole may correspond to a manifold associated with the interior surfaces of teeth located in the lower right portion of the user's jaw.

In some embodiments, the sequence of the holes of the manifold disc successively correspond to different sides of the user's jaw. For example, a first hole may correspond to a manifold associated with the exterior surfaces of teeth located in an upper left portion of a user's jaw, a second hole may correspond to a manifold associated with the interior surfaces of teeth located in the upper left portion of the user's jaw, a third hole may correspond to a manifold associated with the exterior surfaces of teeth located in a lower left portion of the user's jaw, a fourth hole may correspond to a manifold associated with the interior surfaces of teeth located in the lower left portion of the user's jaw, a fifth hole may correspond to a manifold associated with the exterior surfaces of teeth located in an upper right portion of the user's jaw, a sixth hole may correspond to a manifold associated with the interior surfaces of teeth located in the upper right portion of the user's jaw, a seventh hole may correspond to a manifold associated with the exterior surfaces of teeth located in a lower right portion of the user's jaw, and an eighth hole may correspond to a manifold associated with the interior surfaces of teeth located in the lower right portion of the user's jaw.

Other sequences of the holes may be implemented so long as the oral insert vibrates when the manifold selector disc rotates, and pressurized fluid is provided to different surfaces of the user's jaw.

The oral insert includes a tray on which the user places their teeth. The tray includes a top portion that is configured to retain an upper set of teeth and a lower portion that is configured to retain a lower set of teeth. The top portion and bottom portion of the tray include a plurality of bristles arranged in a plurality of rows. The top portion of the tray includes a plurality of rows of bristles configured to contact an exterior surface, a bottom surface, and an interior surface of a tooth. The bottom portion of the tray includers a plurality of rows of bristles configured to contact an exterior surface, a top surface, and an interior surface of a tooth. When a user inserts the oral insert into their mouth, a first row of bristles is located in front of an exterior surface of the user's teeth, an nth row of bristles is located behind an interior surface of the user's teeth, and one or more rows of bristles are located below a bottom or top surface of the user's teeth.

The height of a bristle depends on the row in which the bristle is located. For the top portion of the tray, the height of a first row of bristles is greater than the one or more rows of bristles located below a bottom surface of the user's teeth. The height of the one or more rows of bristles located below the bottom surface of the user's teeth is less than the height of the nth row (last row) of bristles.

For the bottom portion of the tray, the height of a first row of bristles is greater than the one or more rows of bristles located above a top surface of the user's teeth. The height of the one or more rows of bristles located above the top surface of the user's teeth is less than the height of the nth row (last row) of bristles.

In some embodiments, the height of the bristles located in the first row is the same height as the bristles located in the nth row. In some embodiments, the height of the bristles located in the first row is greater than the height of the bristles located in the nth row. In some embodiments, the height of the bristles located in the first row is less than the height of the bristles located in the nth row.

When the oral insert vibrates, the vibration causes bristles to contact the surfaces of the user's teeth (e.g., exterior surface, bottom surface, top surface, interior surface) and remove plaque and/or other substances. The introduction of fluid into the oral insert combined with the oral insert including a plurality of rows of bristles enables the simultaneously brushing of the surfaces of a user's teeth and cleaning the interproximal spaces between the user's teeth. When compared with the amount of time needed to brush and floss, the disclosed oral health device reduces the amount of time that a user needs to perform a complete cleaning of their oral anatomy.

Oral Anatomy

FIGS. 1A-1C are schematic depictions of oral anatomy and dental structures, illustrating the regions of the oral cavity described herein. FIG. 1A depicts a top view of a set of teeth 140 of the mandible or lower jaw (though similar terminology may be used to refer to the teeth and structures of the maxilla or upper jaw). Each tooth 142 may have a facial surface 144 which is the region of the tooth that contacts the cheeks or lips and a lingual surface 146 which is the region of the tooth that contacts (or is nearest to) the tongue. Facial surfaces may be, for example, the buccal surfaces of the posterior teeth and the labial surfaces of the anterior teeth. Lingual surfaces may also be referred to as palatal surfaces for maxillary teeth. Posterior teeth may have an occlusal surface 148 and the anterior teeth may have an incisal edge or surface 150. The occlusal (or incisal) surface is the region of the tooth that aids in chewing, and/or faces across from the occlusal (or incisal) surface of the opposing tooth. The surface of a tooth facing away from the arch midline may be referred to as the distal surface 152 while the surface of a tooth facing toward the arch midline 151 may be referred to as the mesial surface 154.

FIG. 1B depicts a side view of a single tooth 142, which may have a longitudinal axis 156 that extends along the longest dimension of the tooth 142 and/or is substantially perpendicular to the occlusal surface 148 or incisal edge 150 of the tooth. The edge or boundary of the gums (e.g., gingiva, gingival tissue) along the surfaces of the teeth or closest to the occlusal surfaces or incisal edge of the teeth may be referred to as the gingival margin 158. The gingival margin 158 may have one or more curves along the bottom of each tooth, and the radius of curvature and length of the gingival margin for each tooth may vary. A space or region 160 between the gingiva and the surfaces of the tooth may be referred to as a gingival sulcus 160. Interdental gingiva 161 may be the gum tissue located between two adjacent teeth.

FIG. 1C depicts a side view of a plurality of teeth 142. The space or gap between each tooth 142 may be referred to as the interproximal space or gap 162, and may be defined by the mesial surface of one tooth and the distal surface of the adjacent tooth, or the mesial surfaces of two teeth, in the case of central incisor teeth. The left side of a user's oral cavity may be the region of the oral cavity that is to the left of the interproximal space between the two central incisors (e.g., to the left of the arch midline), and the right side of a user's oral cavity may be the region of the oral cavity that is to the right of the interproximal space between the two central incisors (e.g., to the right of the arch midline).

Oral Care Device

FIG. 1D illustrates an example of an oral care device in accordance with some embodiments. In the example shown, oral care device 100 includes base station 102 having a fluid reservoir 103, handle 104, and an oral insert 106 coupled to handle 104. In some embodiments, oral insert 106 is customized for a particular user. In some embodiments, oral insert 106 is customized for a particular type of user (e.g., users having a U-shaped set of teeth with certain dimensions).

One or more fluid conduits or tubes 105 may connect base station 102 to handle 104 and to oral insert 106. In some embodiments, oral care device 100 includes a charging station 101 for handle 104. Handle 104 may comprise one or more control buttons (e.g., a start/stop button, a fluid flow adjustment dial), as may be desirable, which may be positioned variously on the handle for ergonomic or efficient use. In some embodiments, the one or more control buttons may be located on base station 102. For example, oral care device 100 may comprise one or more control buttons on base station 102, and no control buttons on handle 104. In some embodiments, oral care device 100 may not have a handle at all, and may alternatively comprise one or more fluid conduits or tubes that directly connect the fluid from fluid reservoir 103 to oral insert 106. The fluid retained in fluid reservoir 103 may be water, saline, a mouth wash or rinse. (e.g., containing fluoride and/or germicidal or other cleaning and/or teeth protective fluids), and/or any other desirable additive, a brushing agent, and/or a chemical agent.

Oral insert 106 may comprise a plurality of fluid openings or nozzles, and a plurality of bristles that are arranged in accordance with the unique geometry of the user's oral cavity, gingival geometry, and dental structures (and any oral and/or dental devices or implants). Examples of oral and/or dental devices or implants may include, but are not limited to, permanent and removable dental restorations/prosthetics, orthodontic appliances, etc. (e.g., crowns, bridges, implants, braces, retainers, dentures, and the like). Each of the fluid openings or nozzles may be positioned to target a specific dental feature. Inside oral insert 106, the fluid openings or nozzles may be connected to one or more internal manifolds. The inlets of these manifolds may extend from the back of the oral insert (or where desirable for ergonomic and/or efficient use) in the form of a standardized connector, to which handle 104 and/or the one or more fluid conduits or tubes 105 may be connected.

Figure 1E:
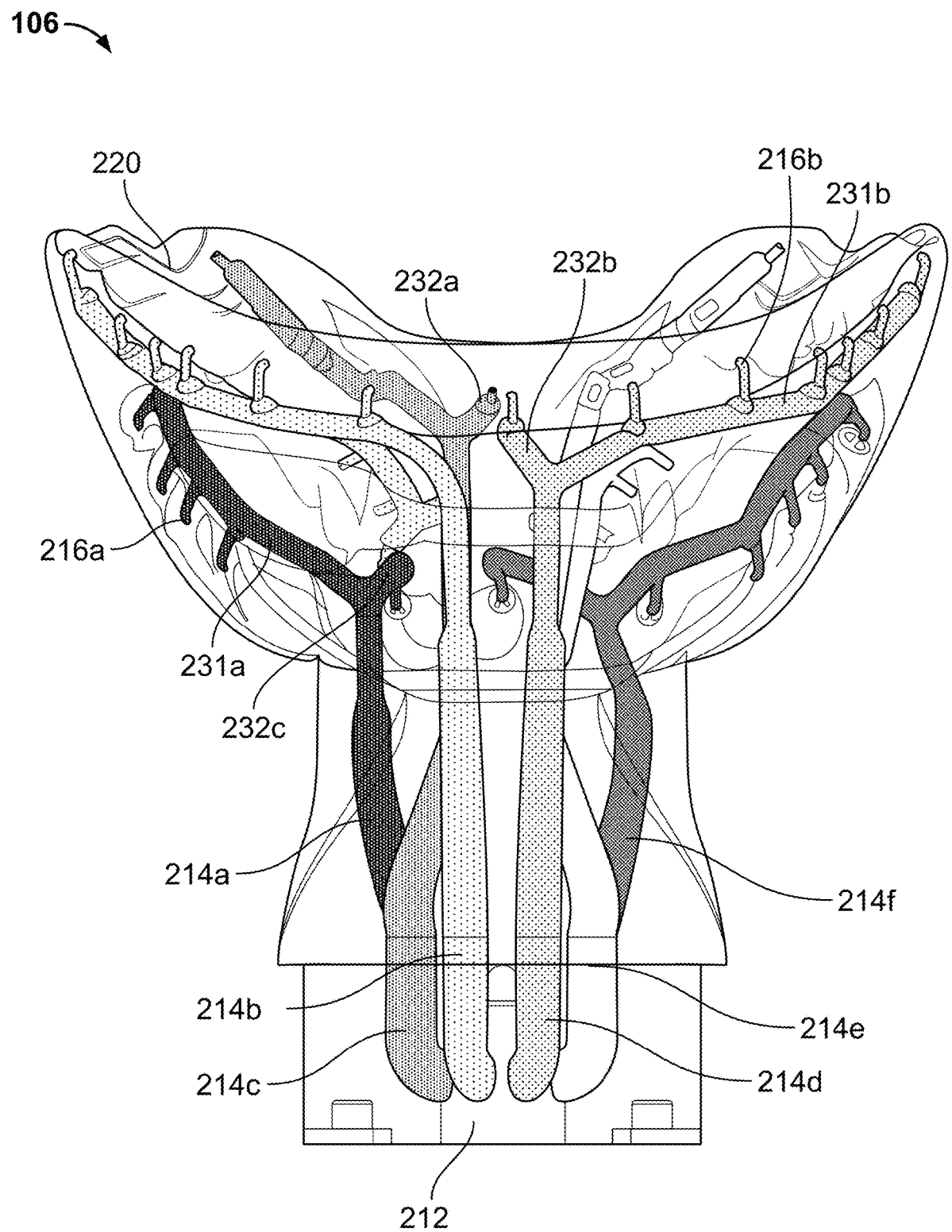
FIG. 1E depicts a schematic perspective view of a set of manifolds of an oral insert.

FIG. 1E depicts a schematic perspective view of a set of manifolds of an oral insert. The oral insert may comprise a fluid inlet port 212 configured to receive fluid and a tray surface 220 configured to retain teeth (not shown). The set of manifolds 214a, 214b, 214c, 214d, 214e, 214f are configured to receive fluid from the fluid inlet port 212. Each manifold may comprise one or more trunks, such as trunks 231a, 231b and branches extending from a trunk, such as branches 232a, 232b, 232c. Fluid nozzles, such as fluid nozzles 216a, 216b may be coupled to respective trunks and branches. In some variations, the set of manifolds 214a, 214b, 214c, 214d, 214e, 214f may extend from the fluid inlet port 212 on either side of a lateral plane bisecting the central incisors (not shown). Directly connecting the trunk to the fluid nozzles corresponding to the central incisors may generate a hydraulically inefficient tortuous path for the trunk. Therefore, in some variations, a branch may be used to couple one or more of the anterior fluid nozzles to the trunk. In FIG. 1E, branches 232a, 232b, 232c extend toward fluid nozzles 216a, 216b, 216c corresponding to the anterior teeth (e.g., central incisors).

Figure 2:
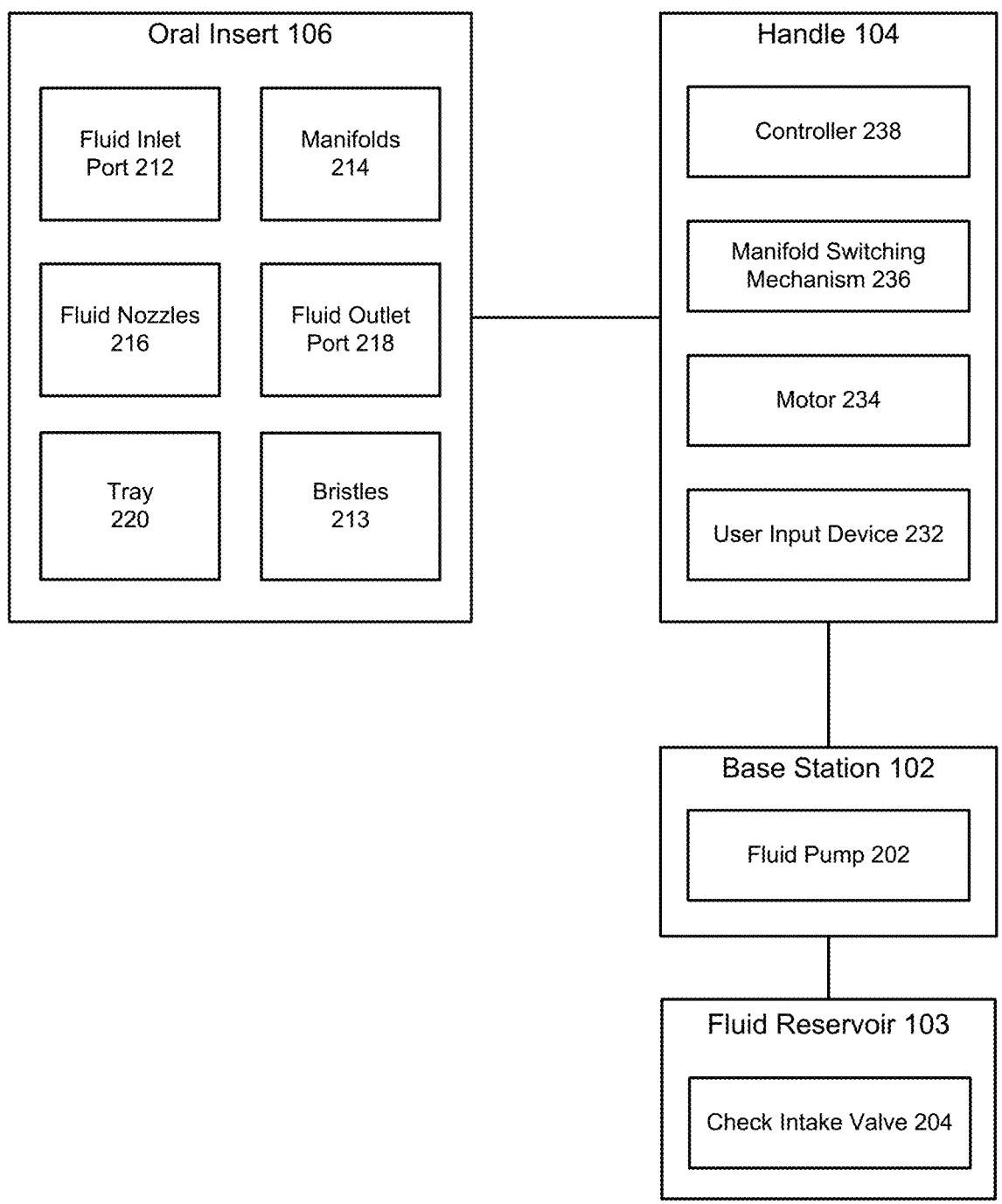
FIG. 2 is a block diagram illustrating an oral health device in accordance with some embodiments.

FIG. 2 is a block diagram illustrating an oral health device in accordance with some embodiments. In the example shown, device 200 includes an oral insert 106 coupled to a fluid delivery system comprised of handle 104, fluid reservoir 103, and base station 102. Fluid reservoir 103 is releasably engaged to base station 102. Base station 102 is releasably engaged to handle 104. Handle 104 is releasably engaged to oral insert 106.

Fluid reservoir 103 includes a check intake valve 204. In some embodiments, check intake valve 204 is located off-centered from a bottom surface of fluid reservoir 103. In some embodiments, check intake valve 204 is located at a center of the bottom surface of fluid reservoir 103. A chemical agent may be added to water that is included in the fluid reservoir 103. The chemical agent, when combined with water, forms a teeth cleaning solution that may be configured to remove compounds associated with a mineral tartar structure. In some embodiments, fluid reservoir 103 is configured to hold a predetermined volume of fluid. For example, fluid reservoir 103 may be configured to hold enough fluid for at least one cleaning cycle.

Base station 102 includes fluid pump 202. Fluid pump 202 is configured to output pressurized fluid from fluid reservoir 103 to oral insert 106 via handle 104. Fluid pump 202 is configured to output pressurized fluid such that a flow rate of the pressurized fluid at each of the fluid nozzles 202 is the same flow rate within a predetermined tolerance. To provide an oral care treatment having a particular efficacy, fluid pump 202 is configured to provide a particular flow rate of fluid having a particular amount of pressure.

Handle 104 includes user input device 232. User input device 232 (e.g., a button, a switch, etc.) is configured to turn on/off motor 234 and fluid pump 202 in response to a user input. Manifold switching mechanism 236 includes a planetary gear carrier, a manifold selector disc, a low friction material, and a manifold disc. When in an "on" state, motor 234 is configured to cause a sun gear of the planetary gear carrier to rotate (clockwise or counterclockwise). The planetary gears of the planetary gear carrier are coupled to the manifold selector disc. The gears of the planetary gear carrier are configured to rotate when the sun gear of the planetary gear carrier rotates. As a result, the manifold selector disc also rotates. The rate at which the manifold selector disc rotates is based on a gear ratio associated with the planetary gear carrier and rotational speed of the motor 234. In one embodiment, the gear ratio is 7:1 or approximately 7:1 (within a threshold).

The manifold disc is comprised of a plurality of holes. The plurality of holes is arranged in a circular pattern. Other patterns may be used (e.g., elliptical). In some embodiments, the plurality of holes is arranged in a different pattern. The holes may be a circle, rectangle, triangle, or other type of shape. Each hole corresponds to one of the manifolds 214 of oral insert 106. The manifold disc selector includes an opening having a shape and dimensions such that when one of the holes of the manifold disc is selected, the other non-selected holes of the manifold disc are not visible from the opening. In the "on" state, fluid is provided from fluid reservoir 103 to one of the manifolds 214 via the selected hole of the manifold disc. The configuration of the manifold switching mechanism 236 may prevent fluid from accidentally being introduced into the other manifolds via the other non-selected holes. The pressurized fluid causes a force to be applied on the manifold selector disc in a direction towards the manifold disc. A low friction material is situated between the manifold disc and the manifold selector disc. The low friction material reduces friction between the manifold disc and the manifold selector disc, and enables motor 234 to rotate the manifold selector disc via the planetary gear carrier.

Device 200 may be in a "cleaning" phase or a "transition" phase during a cleaning cycle of device 200. During the "cleaning" phase, one of the manifolds 214 is selected and an opening of the manifold disc selector exposes a first hole of the manifold disc that corresponds to the selected manifold. Fluid pump 202 causes pressurized fluid to be provided from fluid reservoir 103 and delivered to the selected manifold via handle 104. The pressurized fluid is provided to a user's mouth via the plurality of fluid nozzles that are associated with the selected manifold. Device 200 may be programmed to be in the "cleaning" phase for a particular amount of time (e.g., 1 second). In some embodiments, motor 234 causes the manifold disc selector to continuously rotate during the "on" state and the opening of the manifold disc selector is temporarily aligned with a hold of the manifold disc as the manifold disc selector rotates.

Motor 234 causes the manifold disc selector to continuously rotate during the "on" state and during the "transition" phase, motor 234 causes the manifold disc selector to rotate exposing a portion of the first hole of the manifold disc and a portion of a second hole of the manifold disc. Device 200 is in the "transition" phrase until the second hole of the manifold disc is completely exposed and the other holes of the manifold disc are completely covered. In some embodiments, device 200 may be programmed to be in the "transition" phase for a particular amount of time (e.g., 0.10 seconds).

Each of the plurality of holes is associated with a corresponding manifold of the oral insert of the oral health device. Each manifold of the oral insert is associated with a corresponding portion of the oral anatomy. For example, a first manifold may be associated with the exterior surfaces of teeth located in an upper left portion of a user's jaw, a second manifold may be associated with the interior surfaces of teeth located in an upper left portion of the user's jaw, a third manifold may be associated with the exterior surfaces of teeth located in an upper right portion of the user's jaw, a fourth manifold may be associated with the interior surfaces of teeth located in the upper right portion of the users jaw, a fifth manifold may be associated with the exterior surfaces of teeth located in a lower left portion of a user's jaw, a sixth manifold may be associated with the interior surfaces of teeth located in the lower left portion of the user's jaw, a seventh manifold may be associated with the exterior surfaces of teeth located in a lower right portion of the user's jaw, and an eighth manifold may be associated with the interior surfaces of teeth located in the lower right portion of the user's jaw.

The manner in which the holes of the manifold disc correspond to different surfaces of the user's jaw is selected to cause oral insert 106 to vibrate as the manifold selector disc rotates and pressurized fluid is provided to different surfaces of the user's jaw. In some embodiments, the sequence of the holes of the manifold disc alternately correspond to different sides of the user's jaw. For example, a first hole may correspond to a manifold associated with the exterior surfaces of teeth located in an upper left portion of a user's jaw, a second hole may correspond to a manifold associated with the exterior surfaces of teeth located in an upper right portion of the user's jaw, a third hole may correspond to a manifold associated with the interior surfaces of teeth located in the upper left portion of the user's jaw, a fourth hole may correspond to a manifold associated with the interior surfaces of teeth located in the upper right portion of the user's jaw, a fifth hole may correspond to a manifold associated with the exterior surfaces of teeth located in a lower left portion of the user's jaw, a sixth hole may correspond to a manifold associated with the exterior surfaces of teeth located in a lower right portion of the user's jaw, a seventh hole may correspond to a manifold associated with the interior surfaces of teeth located in the lower left portion of the user's jaw, and an eighth hole may correspond to a manifold associated with the interior surfaces of teeth located in the lower right portion of the user's jaw.

In some embodiments, the sequence of the holes of the manifold disc successively correspond to different sides of the user's jaw. For example, a first hole may correspond to a manifold associated with the exterior surfaces of teeth located in an upper left portion of a user's jaw, a second hole may correspond to a manifold associated with the interior surfaces of teeth located in the upper left portion of the user's jaw, a third hole may correspond to a manifold associated with the exterior surfaces of teeth located in a lower left portion of the user's jaw, a fourth hole may correspond to a manifold associated with the interior surfaces of teeth located in the lower left portion of the user's jaw, a fifth hole may correspond to a manifold associated with the exterior surfaces of teeth located in an upper right portion of the user's jaw, a sixth hole may correspond to a manifold associated with the interior surfaces of teeth located in the upper right portion of the user's jaw, a seventh hole may correspond to a manifold associated with the exterior surfaces of teeth located in a lower right portion of the user's jaw, and an eighth hole may correspond to a manifold associated with the interior surfaces of teeth located in the lower right portion of the user's jaw.

Other sequences of the holes may be implemented so long as oral insert 106 vibrates when the manifold selector disc rotates and pressurized fluid is provided to different surfaces of the user's jaw.

After fluid has been introduced into fluid reservoir 103, fluid is continuously provided by fluid pump 202 to handle 104 when device 200 is turned on until device 200 is turned off or until there is no longer any more fluid in fluid reservoir 103. In some embodiments, motor 234 is coupled to controller 238 that causes motor 234 to rotate according to the programmed "cleaning" and "transition" phases. In some embodiments, a rotational speed of the motor is the same during the "cleaning" phase and the "transition" phase. In some embodiments, a rotational speed of the motor is different during the "cleaning" phase and the "transition" phase. In some embodiments, device 200 is programmed to perform a cleaning process in less than a particular amount of time (e.g., 30 seconds), that is, each of the holes of the manifold disc have been completely exposed by the manifold disc selector at some point in time during the cleaning process.

The fluid structures defined by the oral insert 106 may comprise a fluid inlet port 212, a set of manifolds 214, a set of fluid nozzles 216, and a fluid outlet port (e.g., effluence port) 218. The oral insert 106 may define a tray 220 configured to retain teeth (e.g., upper teeth, lower teeth). The tray 220 may be configured such that at least a portion of the tray 220 corresponds to a shape of the user's teeth.

Oral insert 106 is configured to receive fluid from fluid reservoir 103 at fluid inlet port 224. Fluid inlet port 212 is configured to be in fluid communication with the set of manifolds 214 and the set of nozzles 216. In one embodiment, oral insert 106 includes a set of 8 manifolds where each manifold includes 8 fluid nozzles. Fluid output from the set of nozzles 216 may be directed at the user's oral anatomy, for example, directed at the interproximal spaces between the teeth. A nozzle may be positioned at any location on a manifold. However, the nozzle position is specific to the oral structure of a user.

In some embodiments, each of the manifolds 214 includes a same number of fluid nozzles 216. In some embodiments, at least one of the manifolds 214 includes a different number of fluid nozzles than one or more other manifolds (e.g., the manifold is associated with a portion of the mouth that includes a fewer number of interproximal spaces). When at least one manifold includes a number of fluid nozzles that is different than the number of fluid nozzles associated with the other manifolds associated with the oral insert, the manifold(s) having the different number of fluid nozzles may include one or more flow balancing ports to prevent uneven fluid flow from the fluid nozzles. A flow balancing port may be configured to bleed off a specific amount of excess fluid as fluid flows through the manifold, specifically on manifolds with fewer fluid nozzles than other manifolds in the oral insert.

The manner in which fluid is provided to oral insert 106 causes oral insert 106 to vibrate. A top portion of tray 220 is configured to retain an upper set of teeth. A bottom portion of tray 220 is configured to retain a lower set of teeth. The top portion and bottom portion of tray 220 include a plurality of bristles arranged in a plurality of rows. The top portion of tray 220 includes a plurality of rows of bristles configured to contact an exterior surface, a bottom surface, and an interior surface of a tooth. The bottom portion of tray 220 includers a plurality of rows of bristles configured to contact an exterior surface, a top surface, and an interior surface of a tooth.

For the top portion of tray 220, when a user inserts the oral insert into their mouth, a first row of bristles is located in front of an exterior surface of the user's teeth, an nth row of bristles is located behind an interior surface of the user's teeth, and one or more rows of bristles are located below a bottom surface of the user's teeth. For the bottom portion of tray 220, when a user inserts the oral insert into their mouth, a first row of bristles is located in front of an exterior surface of the user's teeth, an nth row of bristles is located behind an interior surface of the user's teeth, and one or more rows of bristles are located below a top surface of the user's teeth.

The height of a bristle is different depending upon which row the bristle is located. The height of the first row of bristles is different than the one or more rows of bristles located below or above the bottom or top surface of the user's teeth. The height of the first row of bristles is greater than the height of the one or more rows of bristles located below or above the bottom or top surface of the user's teeth. The height of the one or more rows of bristles located below or above the bottom or top surface of the user's teeth is less than the height of the nth row of bristles. In some embodiments, the height of the bristles located in the first row is the same height as the bristles located in the nth row. In some embodiments, the height of the bristles located in the first row is greater than the height of the bristles located in the nth row. In some embodiments, the height of the bristles located in the first row is less than the height of the bristles located in the nth row.

In some embodiments, the plurality of rows is customized to the oral anatomy of a user. In some embodiments, the plurality of rows is standardized for different size oral inserts. For example, the location and number of the plurality of fluid nozzles for a "small-sized" oral insert is different than the location and number of the plurality of fluid nozzles for a "medium-sized" oral insert. A "small-sized" oral insert may include four rows of bristles and a "medium-sized" oral insert may include five rows of bristles.

The dimensions of a bristle may be customized to the oral anatomy of a user. The dimensions of a bristle may be standardized for different size oral inserts. For example, the dimensions of a bristle for a "medium-sized" oral insert may be different than the bristle for a "large-sized" oral insert.

In some embodiments, the shape of a bristle is cylindrical. In some embodiments, the shape of a bristle is pyramidal. In some embodiments, the bristles are cilia-shaped bristles.

The number of rows within the oral insert may change based on a location of the bristles within the oral insert. For example, the number of rows of bristles in a molar portion of the oral insert may be different than the number of rows of bristles in an incisor portion of the oral insert.

Figure 15:
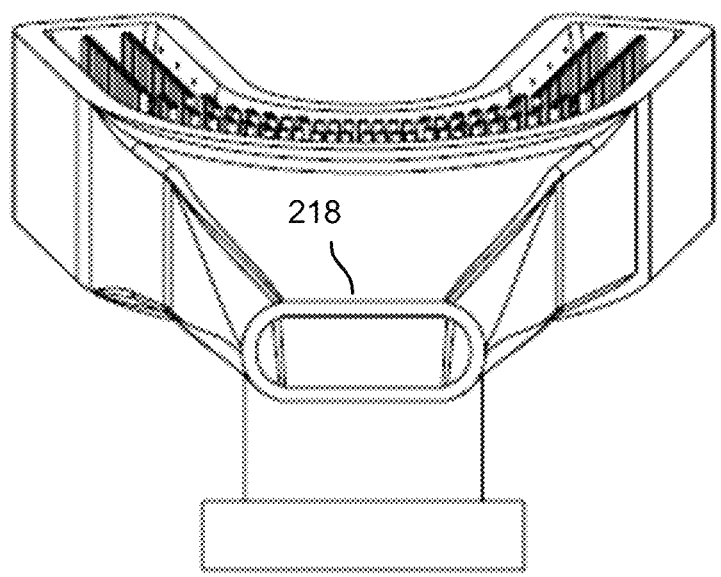
FIG. 15 illustrates a front view of an oral insert in accordance with some embodiments.

When the oral insert vibrates, the vibration causes bristles to contact the surfaces of the user's teeth (e.g., exterior surface, bottom surface, top surface, interior surface) and remove plaque and/or other substances. After the fluid passes through and/or irrigates the user's oral anatomy, the fluid may then be guided to the fluid outlet port 218 to exit the user's oral cavity. In some variations, fluid may flow sequentially into fluid inlet port 212 and through the set of manifolds 214 and their respective nozzles 216. The set of nozzles 216 may be configured to output fluid toward the oral anatomy. Fluid outlet port 218 may then receive the fluid (e.g., effluence) and channel it away from the user's oral anatomy. FIG. 15 depicts an example of the fluid outlet port 218 of the oral insert.

The introduction of fluid into the oral insert combined with the oral insert having a plurality of rows of bristles enables the simultaneously brushing of the surfaces of a user's teeth and cleaning of the interproximal spaces between the user's teeth. When compared with the amount of time needed to brush and floss, the disclosed oral health device reduces the amount of time that a user needs to perform a complete cleaning of their oral anatomy.

Figure 3:
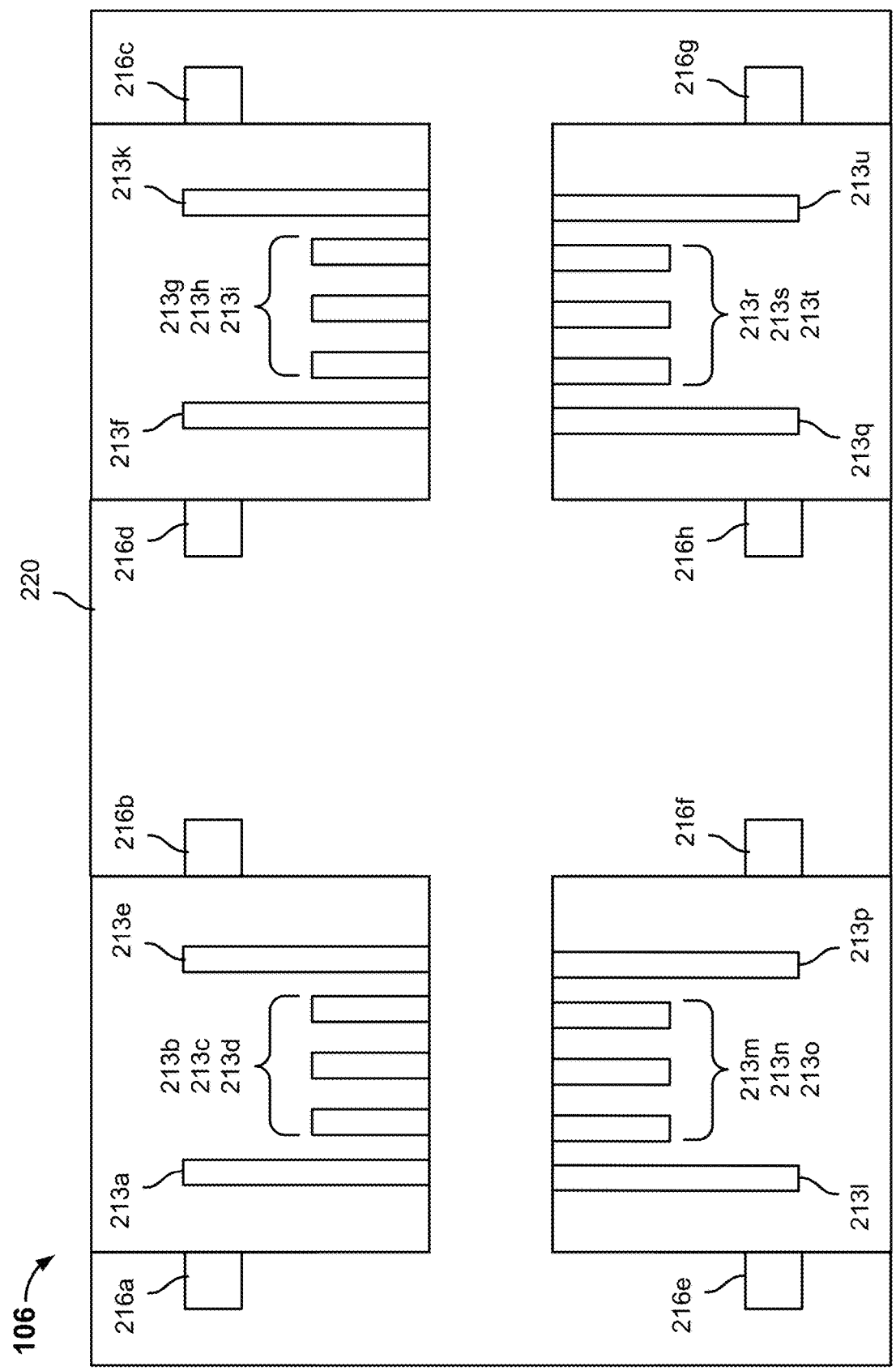
FIG. 3 is a block diagram illustrating a back view of an oral insert in accordance with some embodiments.

FIG. 3 is a block diagram illustrating a back view of an oral insert in accordance with some embodiments. In the example shown, oral insert 106 includes a tray 220. A top portion of tray 220 is configured to retain an upper set of teeth associated with a user. A bottom portion of tray 220 is configured to retain a lower set of teeth associated with a user.

Oral insert 106 includes fluid nozzle 216a that is part of a first manifold that is associated with the exterior surfaces of teeth located in an upper left portion of a user's jaw, fluid nozzle 216b that is part of a second manifold that is associated with the interior surfaces of teeth located in an upper left portion of the user's jaw, fluid nozzle 216c that is part of a third manifold that is associated with the exterior surfaces of teeth located in an upper right portion of the user's jaw, fluid nozzle 216d that is part of a fourth manifold that is associated with the interior surfaces of teeth located in the upper right portion of the user's jaw, fluid nozzle 216e that is part of a fifth manifold that is associated with the exterior surfaces of teeth located in a lower left portion of a user's jaw, fluid nozzle 216f that is part of a sixth manifold that is associated with the interior surfaces of teeth located in the lower left portion of the user's jaw, fluid nozzle 216g that is part of a seventh manifold that is associated with the exterior surfaces of teeth located in a lower right portion of the user's jaw, and fluid nozzle 216h that is part of an eighth manifold that is associated with the interior surfaces of teeth located in the lower right portion of the user's jaw.

The upper left portion of tray 220 includes a first plurality of bristles 213a-213e, the upper right portion of tray 220 includes a second plurality of bristles 213f-213k, the lower left portion of tray 220 includes a third plurality of bristles 213l-213p, and the lower right portion of tray 220 includes a fourth plurality of bristles 213q-213u.

Fluid is introduced into oral insert 106 in a manner that causes tray 220 to vibrate. In some embodiments, when a user has inserted oral insert 106 into their mouth, fluid is alternatively introduced to different sides of the user's jaw. For example, fluid may be provided via fluid nozzle 216a, then fluid nozzle 216c, then fluid nozzle 216b, then fluid nozzle 216d, then fluid nozzle 216e, then fluid nozzle 216g, then fluid nozzle 216f, and then fluid nozzle 216h. The pattern may continue to repeat until a predetermined amount of time has passed or there is no more fluid in fluid reservoir 103.

In some embodiments, when a user has inserted oral insert 106 into their mouth, fluid is successively introduced to different sides of the user's jaw. For example, fluid may be provided via fluid nozzle 216a, then fluid nozzle 216b, then fluid nozzle 216e, then fluid nozzle 216f, then fluid nozzle 216c, then fluid nozzle 216d, then fluid nozzle 216g, and then fluid nozzle 216h. The pattern may continue to repeat until a predetermined amount of time has passed or there is no more fluid in fluid reservoir 103.

Other patterns may be implemented so long as the oral insert vibrates when fluid is provided via the plurality of fluid nozzles 216a, 216b, 216c, 216d, 216e, 216f, 216g, 216h.

When the oral insert vibrates, the vibration causes bristles 213a-213u to contact respective surfaces of the user's teeth (e.g., exterior surface, bottom surface, top surface, interior surface) and remove plaque and/or other substances. The introduction of fluid into oral insert 106 combined with the oral insert 106 including a plurality of rows of bristles enables the simultaneously brushing of the surfaces of a user's teeth and cleaning the interproximal spaces between the user's teeth.

Figure 4A:
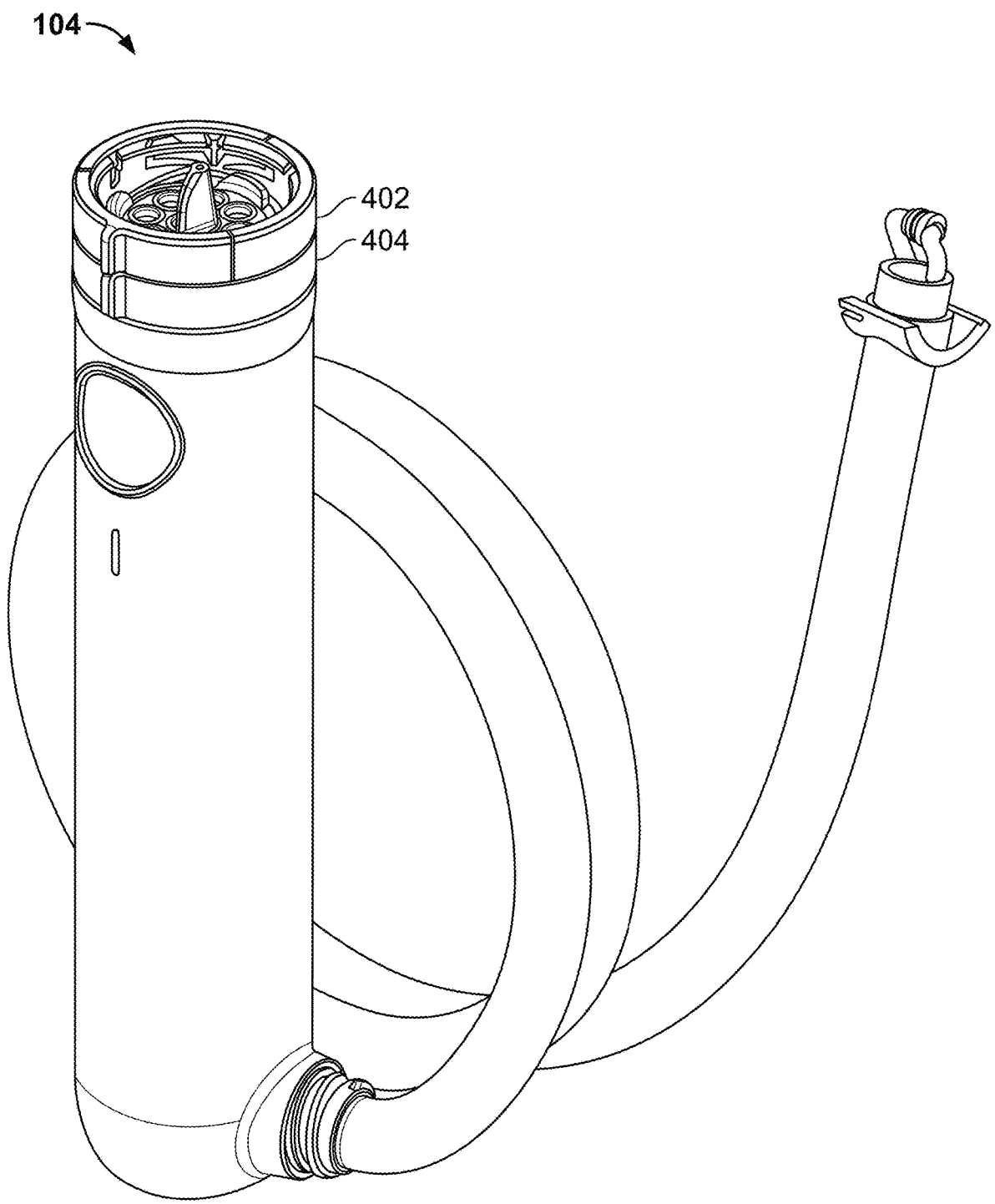
FIGS. 4A-C are diagrams illustrating a handle in accordance with some embodiments.
Figure 4B:
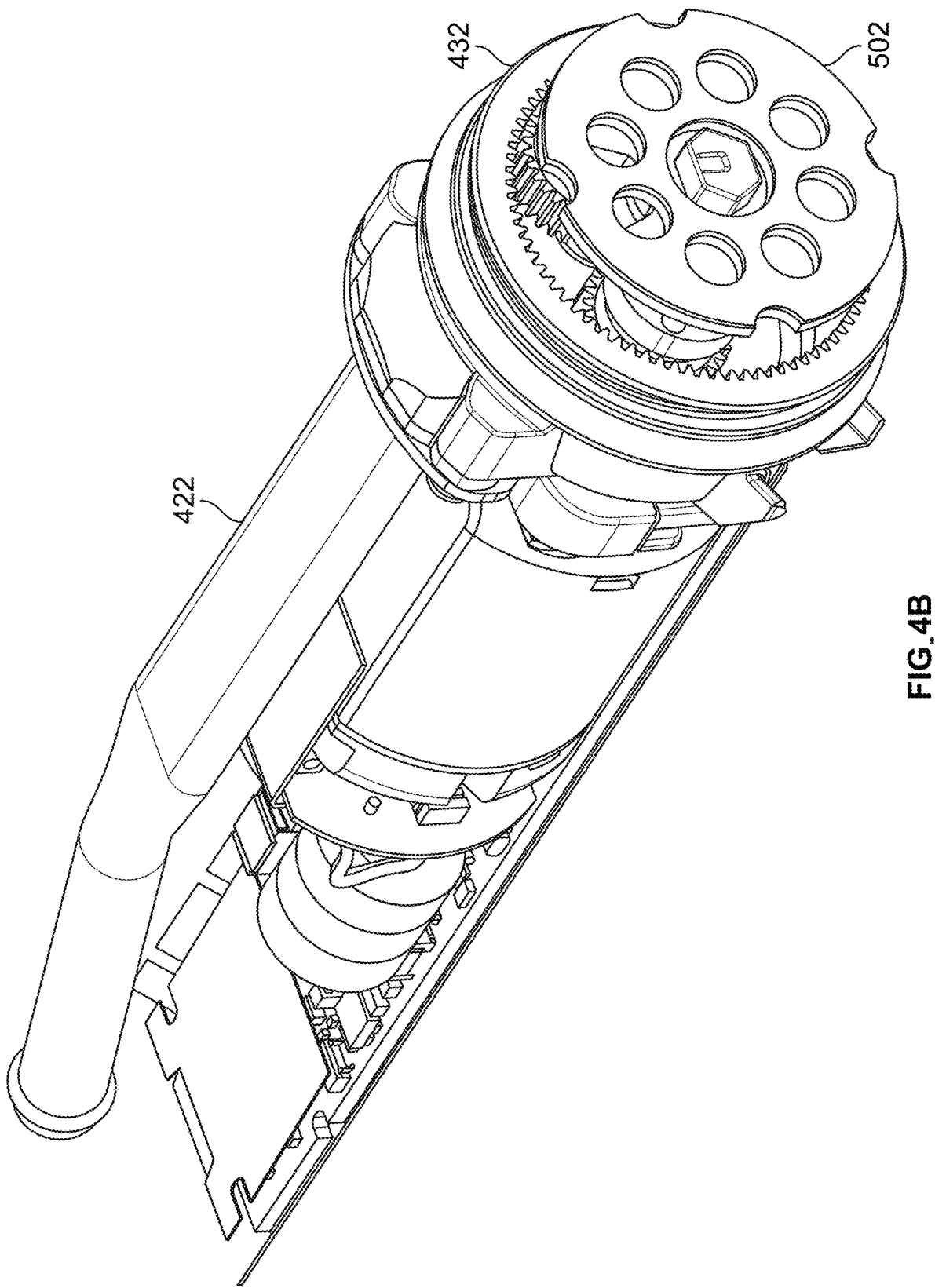
Figure 4C:
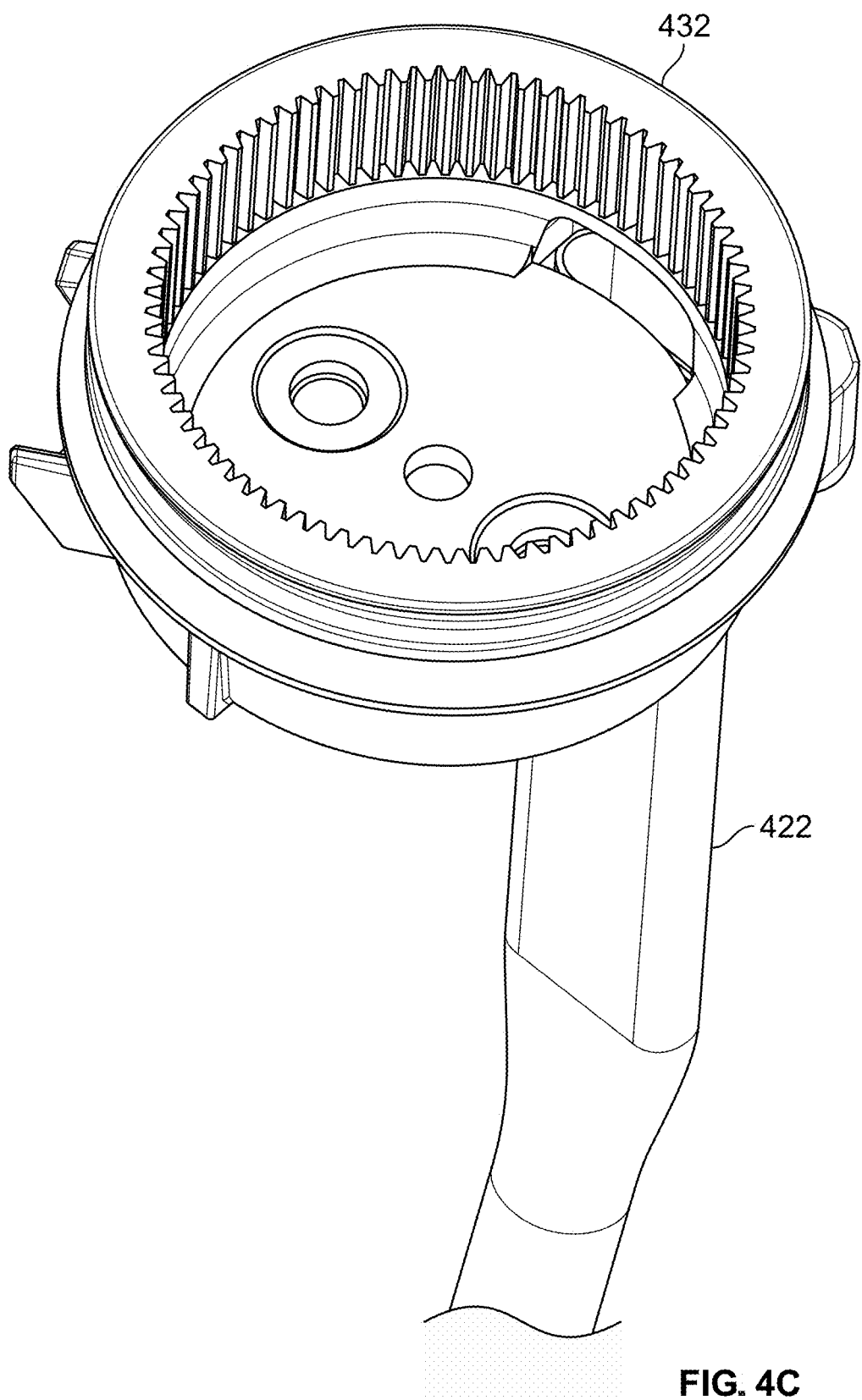

FIG. 4A is a diagram illustrating a handle in accordance with some embodiments. In the example shown, handle 104 includes handle seal 404 coupled to mouthpiece seal 402. As seen in FIG. 4B, the interior of the handle 104 includes a plurality of components, a tube 422, a gearbox 432, and a manifold disc 502. As seen in FIG. 4C, tube 422 is configured to provide fluid to the gearbox 432.

Figure 5:
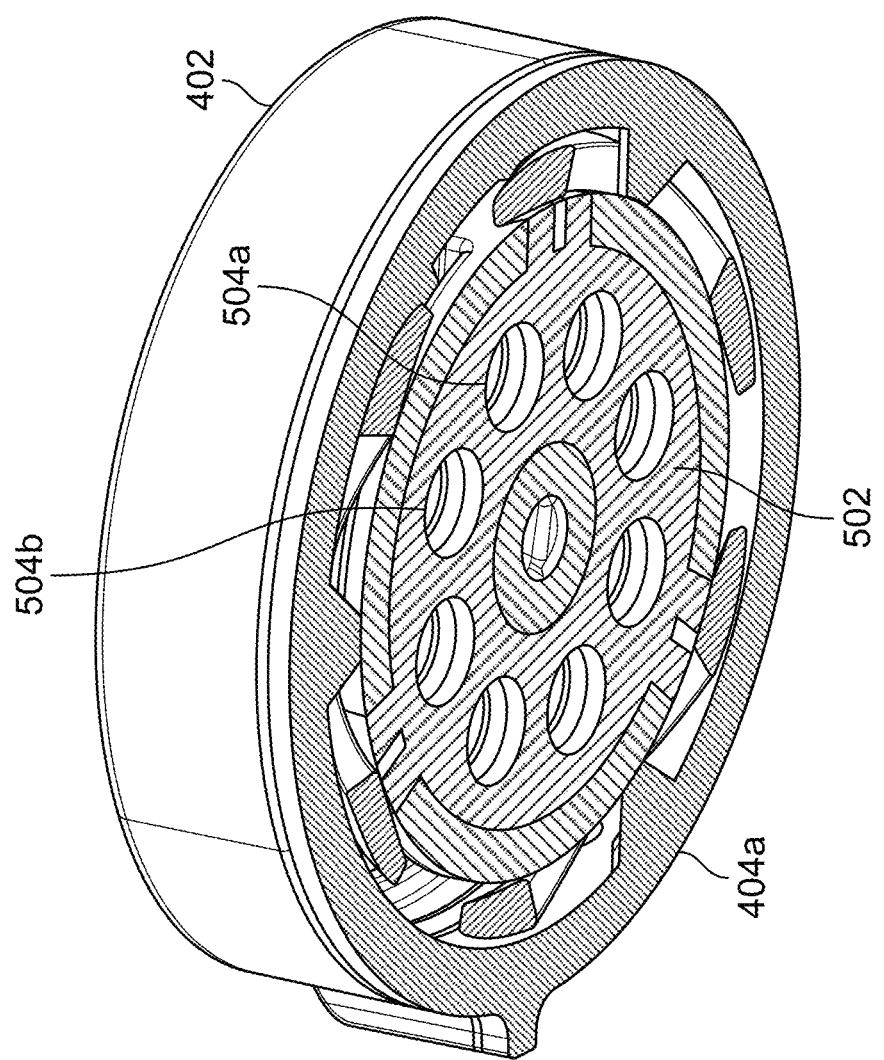
FIG. 5 is a diagram illustrating a first portion of the handle seal in accordance with some embodiments.

FIG. 5 is a diagram illustrating a first portion of the handle seal in accordance with some embodiments. In the example shown, the first portion 404a of the handle seal 404 includes a manifold disc 502 that includes a plurality of holes. Each of the plurality of holes corresponds to one of the manifolds of an oral insert.

In the example shown, manifold disc 502 includes eight holes, such as holes 504a, 504b. Oral insert 106 may include eight internal manifolds. Each hole of manifold disc 502 corresponds to one of the internal manifolds of oral insert 106.

Figure 6A:
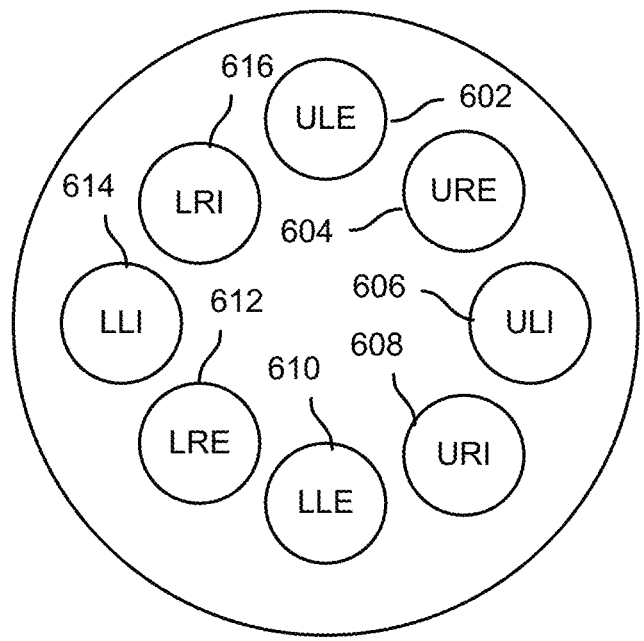
FIGS. 6A and 6B are diagrams illustrating a correspondence between the holes associated with a manifold disc and the different manifolds associated with an oral insert in accordance with some embodiments.

FIG. 6A is a diagram 600 illustrating a correspondence between the holes associated with a manifold disc and the different manifolds associated with an oral insert in accordance with some embodiments. In the example shown, hole 602 corresponds to a manifold associated with the exterior surfaces of teeth located in an upper left portion of a user's jaw, hole 604 corresponds to a manifold associated with the exterior surfaces of teeth located in an upper right portion of the user's jaw, hole 606 corresponds to a manifold associated with the interior surfaces of teeth located in the upper left portion of the user's jaw, hole 608 corresponds to a manifold associated with the interior surfaces of teeth located in the upper right portion of the user's jaw, hole 610 corresponds to a manifold associated with the exterior surfaces of teeth located in a lower left portion of the user's jaw, hole 612 corresponds to a manifold associated with the exterior surfaces of teeth located in a lower right portion of the user's jaw, hole 614 corresponds to a manifold associated with the interior surfaces of teeth located in the lower left portion of the user's jaw, and hole 616 corresponds to a manifold associated with the interior surfaces of teeth located in the lower right portion of the user's jaw.

Figure 6B:
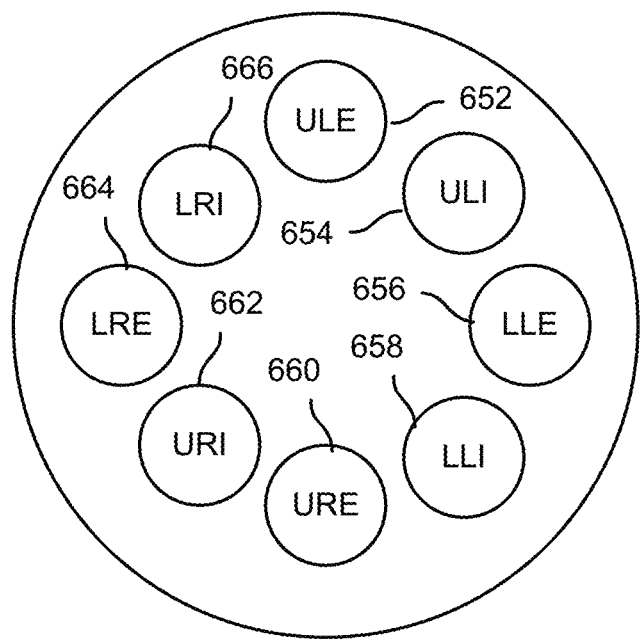

FIG. 6B is a diagram 650 illustrating a correspondence between the holes associated with a manifold disc and the different manifolds associated with an oral insert in accordance with some embodiments. In the example shown, hole 652 corresponds to a manifold associated with the exterior surfaces of teeth located in an upper left portion of a user's jaw, hole 654 corresponds to a manifold associated with the interior surfaces of teeth located in the upper left portion of the user's jaw, hole 656 corresponds to a manifold associated with the exterior surfaces of teeth located in a lower left portion of the user's jaw, hole 658 corresponds to a manifold associated with the interior surfaces of teeth located in the lower left portion of the user's jaw, hole 660 corresponds to a manifold associated with the exterior surfaces of teeth located in an upper right portion of the user's jaw, hole 662 corresponds to a manifold associated with the interior surfaces of teeth located in the upper right portion of the user's jaw, hole 664 corresponds to a manifold associated with the exterior surfaces of teeth located in a lower right portion of the user's jaw, and hole 666 corresponds to a manifold associated with the interior surfaces of teeth located in the lower right portion of the user's jaw.

Figure 7:
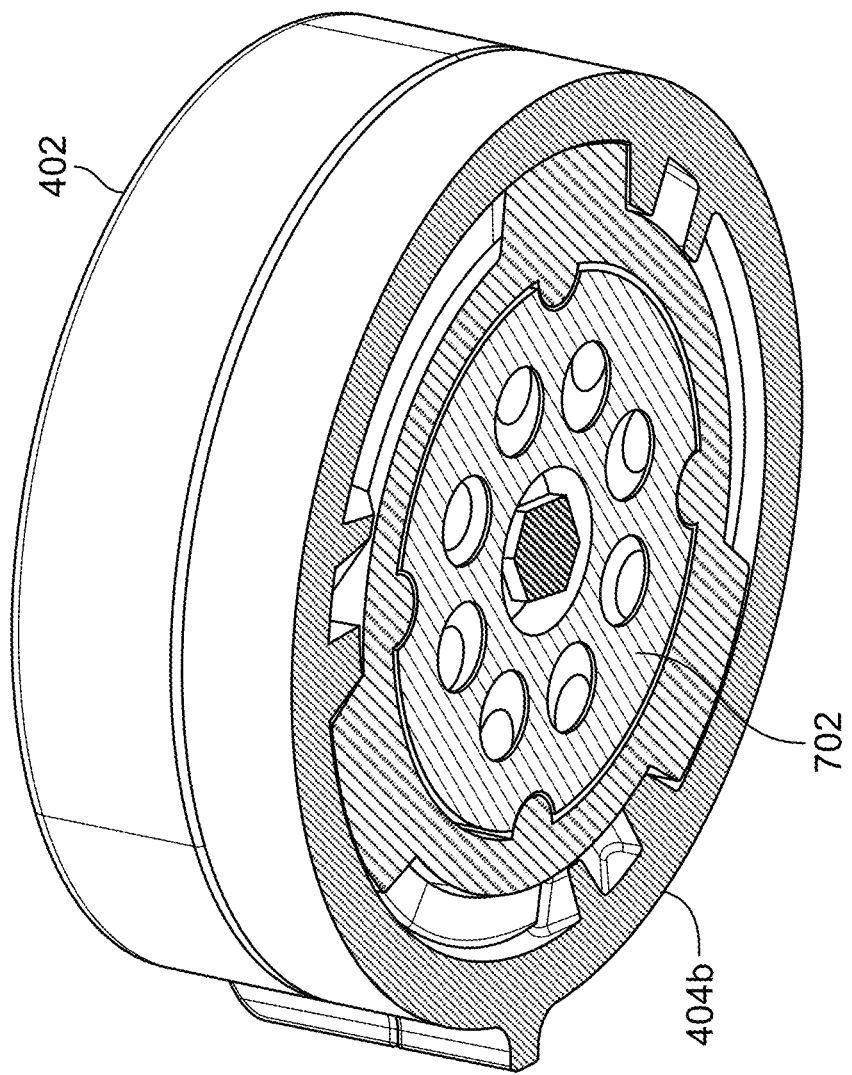
FIG. 7 is a diagram illustrating a second portion of the handle seal in accordance with some embodiments.

FIG. 7 is a diagram illustrating a second portion of the handle seal in accordance with some embodiments. In the example shown, the second portion 404b of the handle seal 404 includes a low friction material 702 (e.g., a material having a friction coefficient less than a threshold value). Examples of low friction material 702 include, but are not limited to, POM (PolyOxyMethylene), POM-C (Acetal Copolymer), or POM-H (Delrin). The low friction material 702 includes a same number of holes as manifold disc 502. In the example shown, low friction material 702 also includes eight holes.

Figure 8:
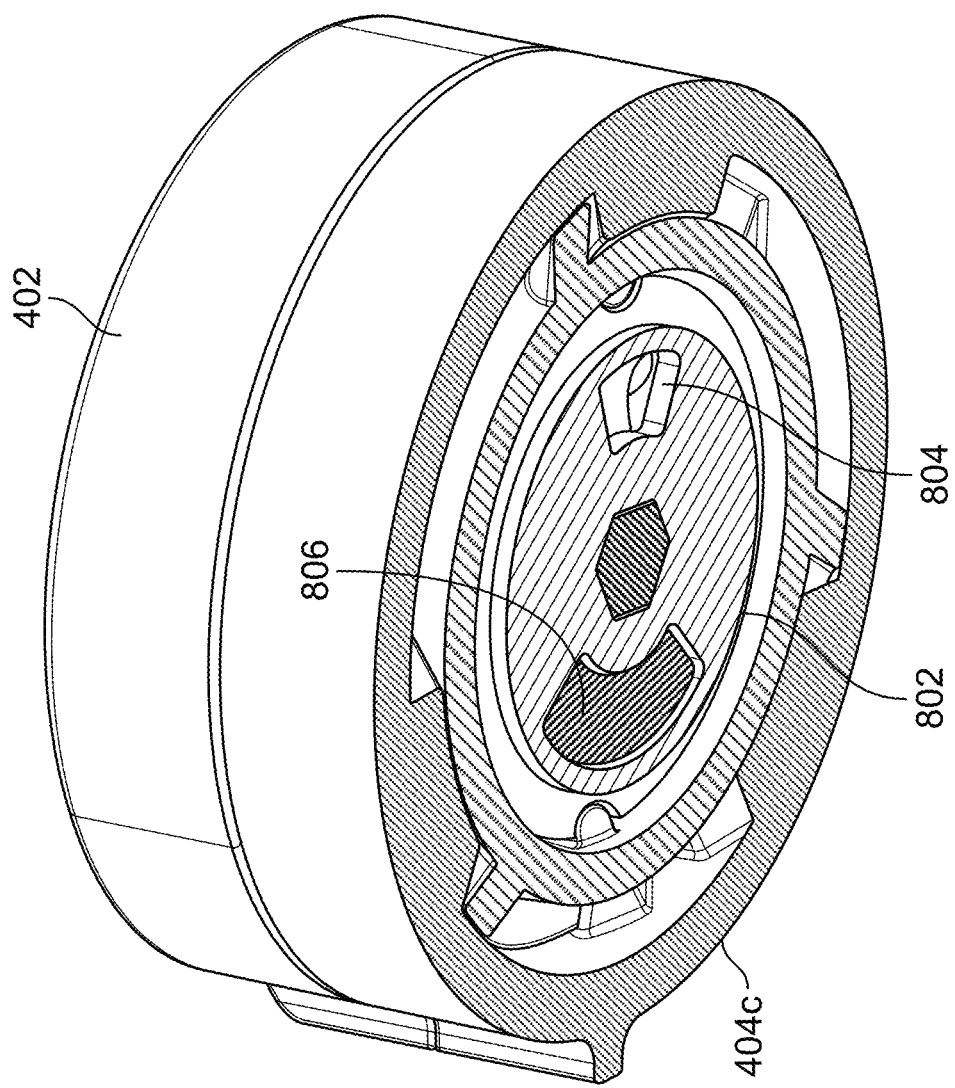
FIG. 8 is a diagram illustrating a third portion of the handle seal in accordance with some embodiments.
Figure 9A:
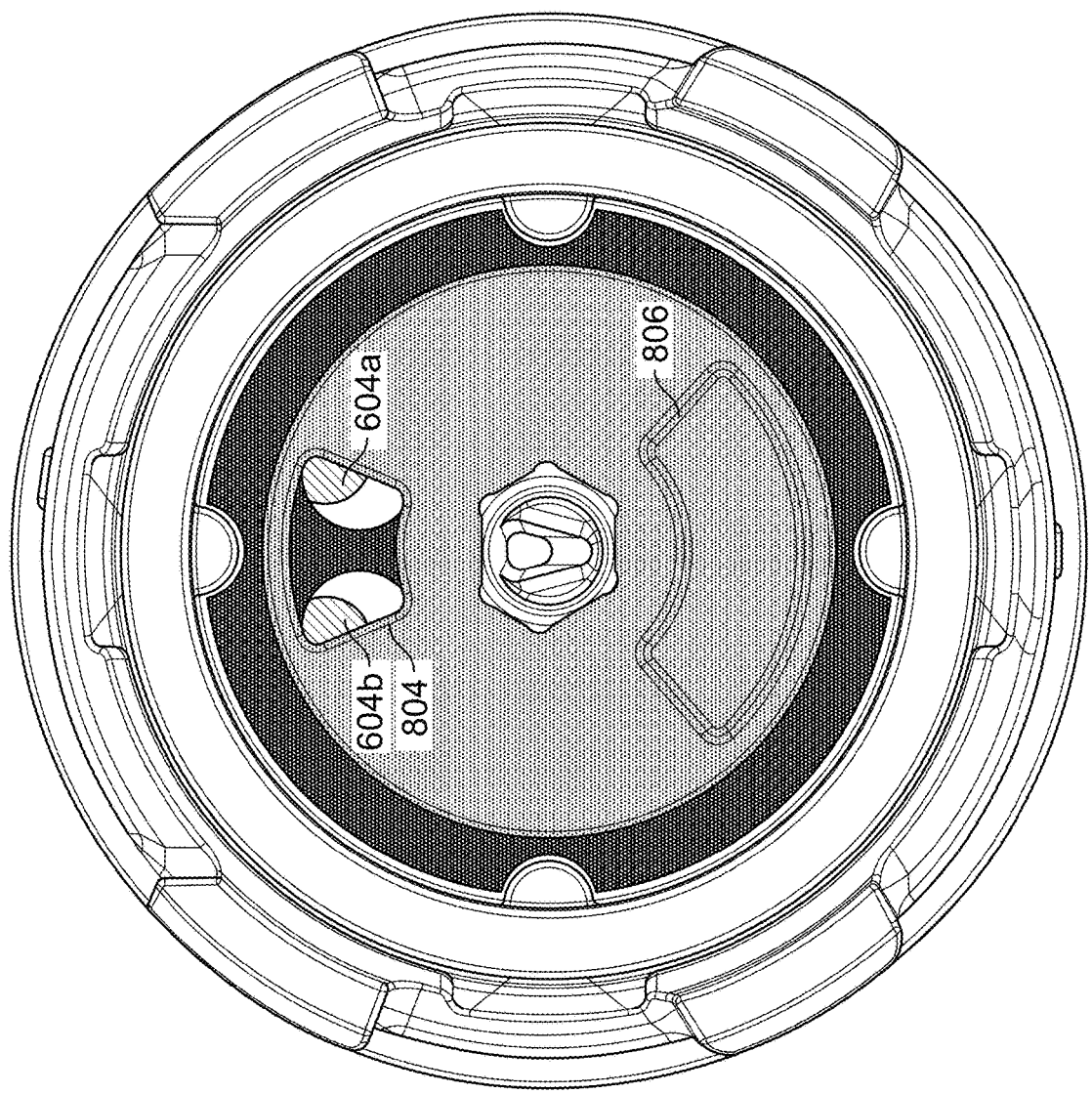
FIG. 9A illustrates the manifold selector disc transitioning from a first position to a second position in accordance with some embodiments.
Figure 9B:
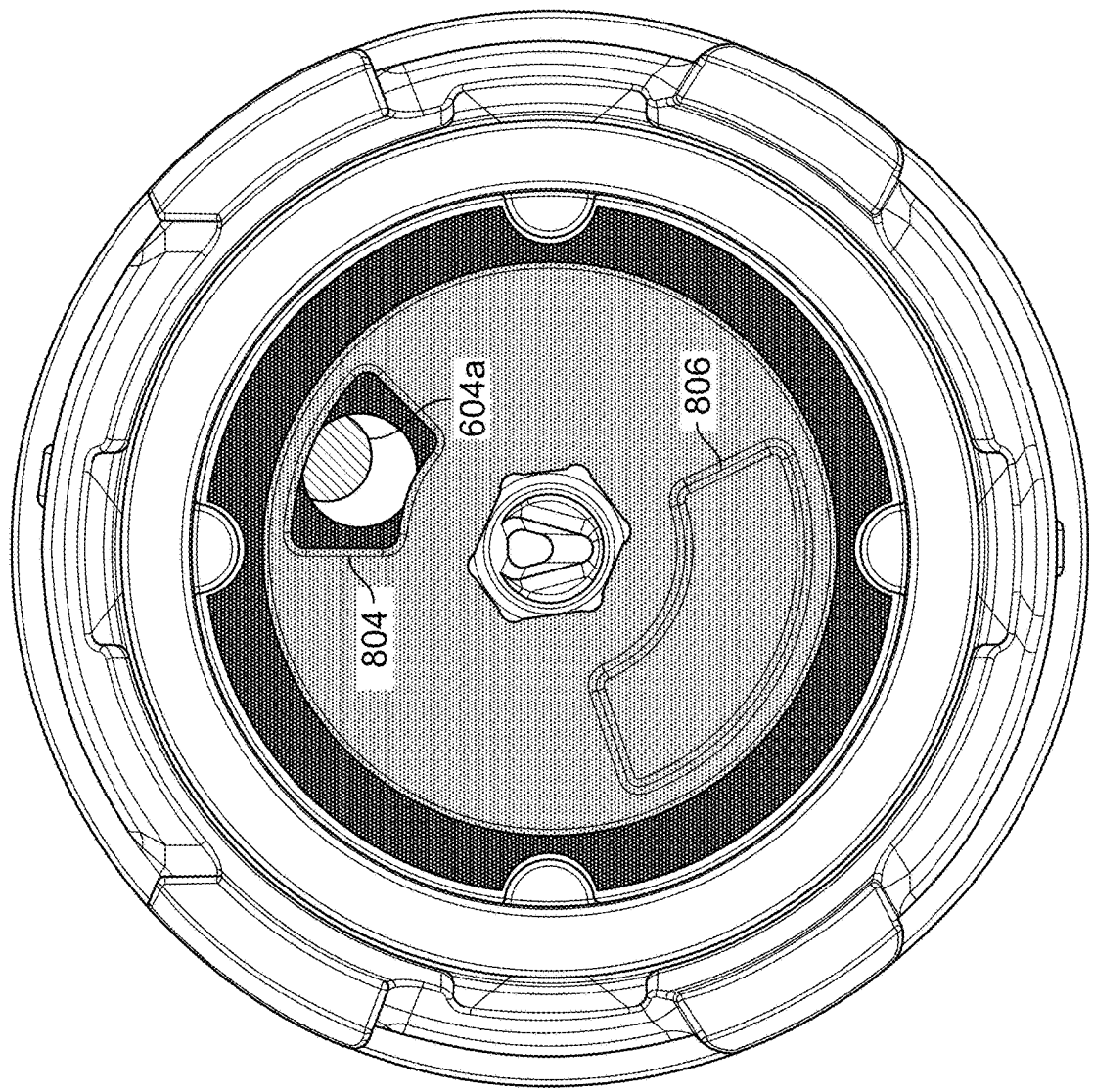
FIG. 9B illustrates a manifold selector disc in a second position in accordance with some embodiments.

FIG. 8 is a diagram illustrating a third portion of the handle seal in accordance with some embodiments. In the example shown, the third portion 404c of the handle seal 404 includes a manifold selector disc 802. The manifold selector disc 802 includes an opening 804 (also referred to as a "gateway"). The manifold selector disc 802 includes a cut-out 806 that is opposite to the opening 804. In the example shown, opening 804 has a trapezoidal shape. Opening 804 may have other shapes. When transitioning between a first manifold and a second manifold, as seen in FIG. 9A, opening 804 is configured to expose a portion of a first hole of manifold disc 602 corresponding to the first manifold and a portion of a second hole of manifold disc 602 corresponding to the second manifold. As seen in FIG. 9B, opening 804 has size and dimensions such that only one of the holes 604a of manifold disc 602 is exposed when the manifold associated with the hole is selected.

FIG. 10 is a diagram illustrating a fourth portion of the handle seal in accordance with some embodiments. In the example shown, the fourth portion 404d of the handle seal 404 includes a planetary gear carrier comprised of a sun gear 1002, a first planet gear 1004a, a second planet gear 1004b, a third planet gear 1004c, and a ring gear 1006. The planetary gear carrier includes a carrier that is not shown for illustrative purposes. Although the planetary gear carrier is depicted as including three planet gears, the planetary gear carrier may have 2:n planet gears.

Figure 11:
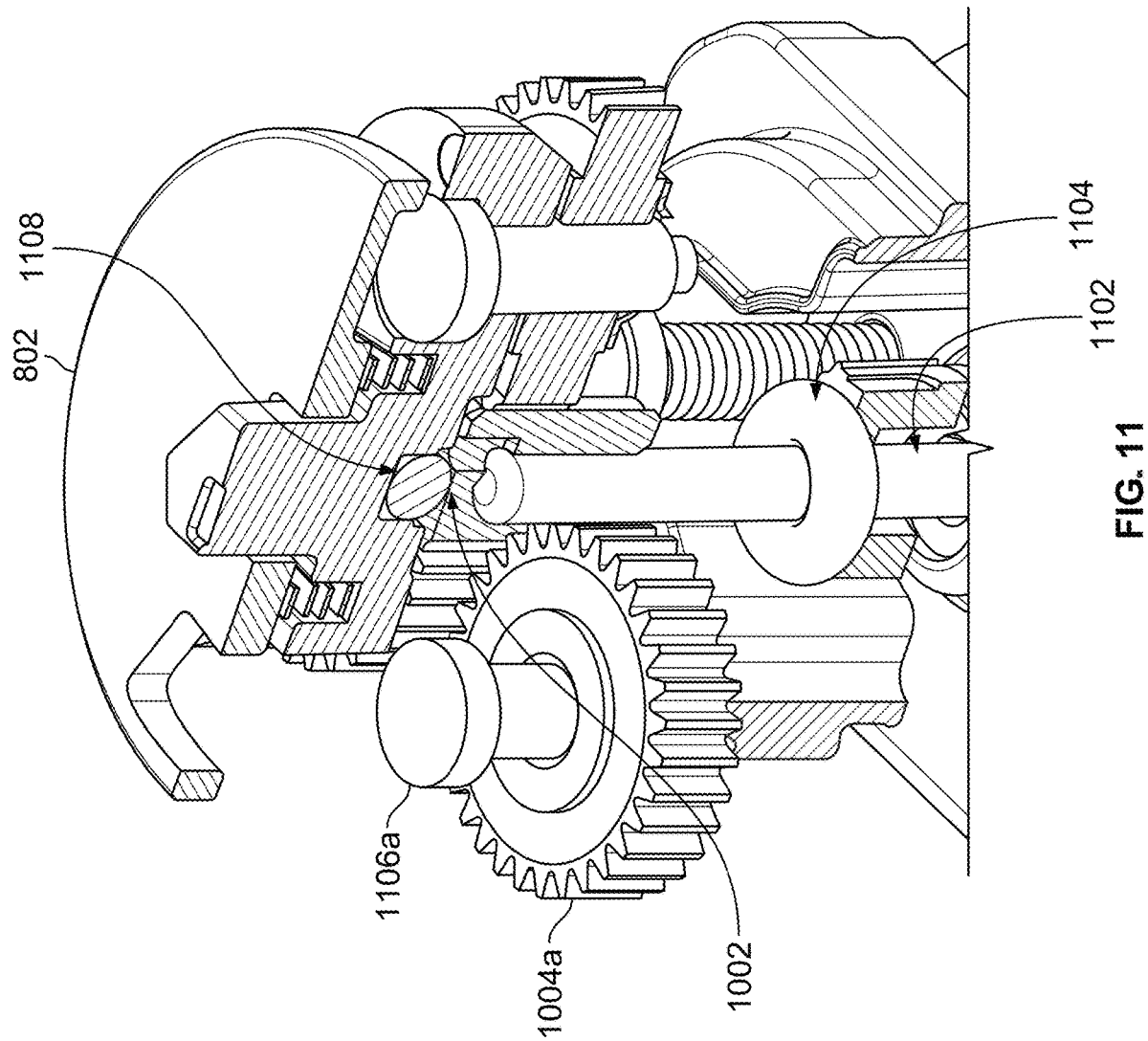
FIG. 11 illustrates a perspective view of the internal components of a gearbox in accordance with some embodiments.

The sun gear 1002 is coupled to a motor, such as motor 234, via motor shaft 1102 of FIG. 11. Motor 234 is configured to cause the sun gear 1002 to rotate. The first planet gear 1004a, the second planet gear 1004b, and the third planet gear 1004c are coupled to the manifold selector disk 802. When sun gear 1002 rotates, the first planet gear 1004a, the second planet gear 1004b, and the third planet gear 1004c cause the manifold selector disk 802 to rotate.

As seen in FIG. 11, the planet gear 1004a is configured to rotate around axles 1106a. The other planet gears are configured to rotate around respective axles. The rate at which the manifold selector disc 802 rotates depends on the gear ratio associated with the planetary gear carrier and rotational speed of the motor. In one embodiment, the gear ratio is 7:1 or approximately 7:1 (within a threshold). A bottom portion of motor shaft 1102 is sealed from the other parts of the handle seal via O-ring 1104. O-ring 1104 seals the switcher chamber that includes the planetary gear carrier/manifold selector disk assembly from the motor and other handle electronics, such as the electronics associated with user input device 232. The location of O-ring 1104 enables a smaller and cheaper motor to be used for the oral health device. Drag torque is a function of sealing radius. If the seal was placed on the outside of the planetary gear carrier, then a diameter of motor shaft 1102 would need to be 2-3× larger because the torque would have been amplified by the gearing, so the friction would have been 2-3× higher. Point contact bearing 1108 enables the planetary gear carriers to pivot along two axes (e.g., pitch and yaw) while enabling the planetary gear carrier/manifold selector disk assembly to rotate.

Figure 12:
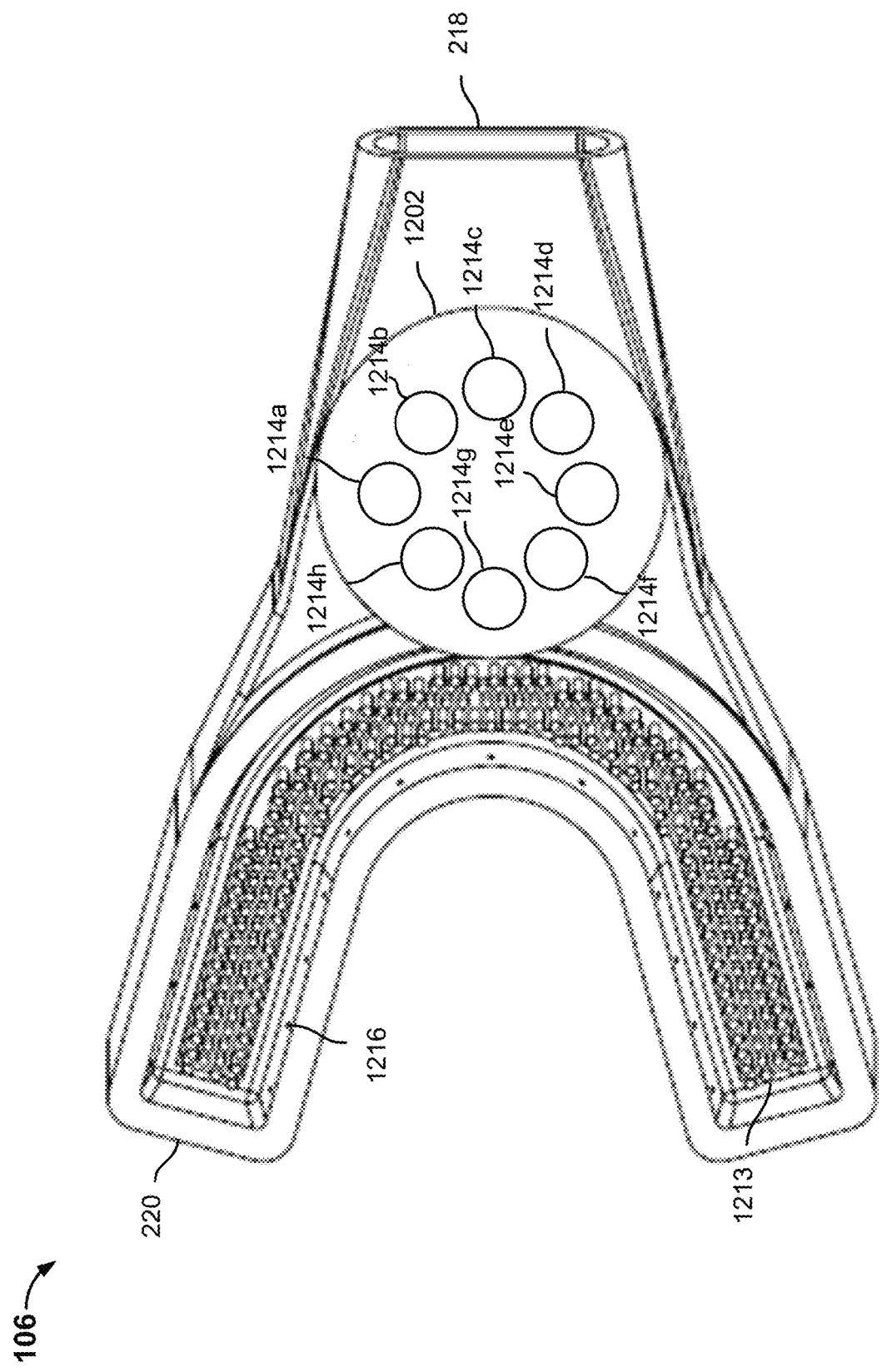
FIG. 12 illustrates a bottom view of an oral insert in accordance with some embodiments.

FIG. 12 illustrates a bottom view of an oral insert in accordance with some embodiments. In the example shown, oral insert 106 includes a base 1202 comprised of a plurality of manifold holes 1214a, 1214b, 1214c, 1214d, 1214e, 1214f, 1214g, and 1214h. Each of the manifold holes corresponds to one of the internal manifolds 214 of oral insert 106. Base 1202 is configured to be inserted into mouthpiece seal 402. A bottom portion of tray 220 includes a plurality of fluid nozzles, such as fluid nozzle 1216, and a plurality of bristles, such as bristle 1213.

Figure 13:
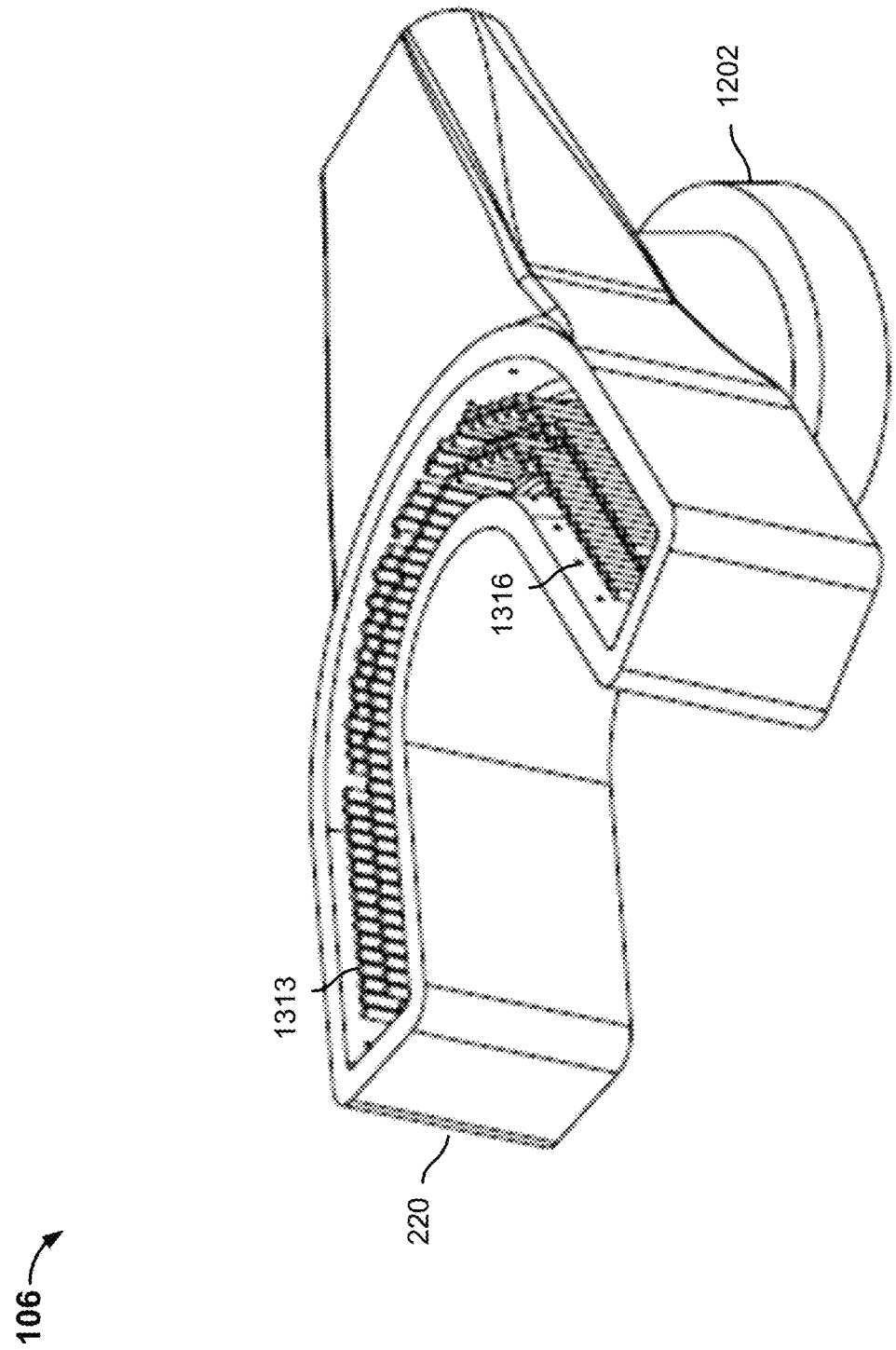
FIG. 13 illustrates a perspective view of an oral insert in accordance with some embodiments.

FIG. 13 illustrates a perspective view of an oral insert in accordance with some embodiments. In the example shown, the top portion of tray 220 includes a plurality of fluid nozzles, such as fluid nozzle 1316, and a plurality of bristles, such as bristle 1313.

Figure 14:
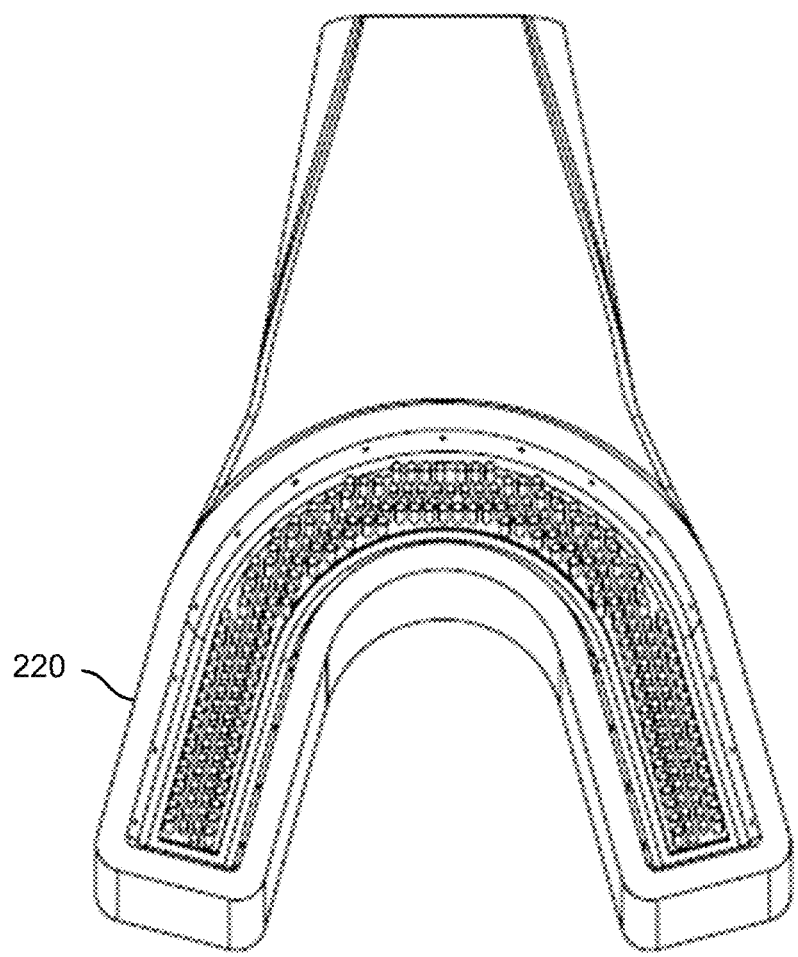
FIG. 14 illustrates a perspective view of an oral insert in accordance with some embodiments.

FIG. 14 illustrates a perspective view of an oral insert in accordance with some embodiments. In the example shown, the top portion of tray 220 includes a plurality of bristles that are arranged in a plurality of rows.

The height of a bristle is different depending upon which row the bristle is located. The height of the first row of bristles is different than the one or more rows of bristles located below or above the bottom or top surface of the user's teeth. The height of the first row of bristles is greater than the height of the one or more rows of bristles located below or above the bottom or top surface of the user's teeth. The height of the one or more rows of bristles located below or above the bottom or top surface of the user's teeth is less than the height of the nth row of bristles. In some embodiments, the height of the bristles located in the first row is the same height as the bristles located in the nth row. In some embodiments, the height of the bristles located in the first row is greater than the height of the bristles located in the nth row. In some embodiments, the height of the bristles located in the first row is less than the height of the bristles located in the nth row.

In some embodiments, the plurality of rows is customized to the oral anatomy of a user. In some embodiments, the plurality of rows is standardized for different size oral inserts. For example, the location and number of the plurality of fluid nozzles for a "small-sized" oral insert is different than the location and number of the plurality of fluid nozzles for a "medium-sized" oral insert. A "small-sized" oral insert may include four rows of bristles and a "medium-sized" oral insert may include five rows of bristles.

The dimensions of a bristle may be customized to the oral anatomy of a user. The dimensions of a bristle may be standardized for different size oral inserts. For example, the dimensions of a bristle for a "medium-sized" oral insert may be different than the bristle for a "large-sized" oral insert.

In some embodiments, the shape of a bristle is cylindrical. In some embodiments, the shape of a bristle is pyramidal. In some embodiments, the bristles are cilia-shaped bristles.

The number of rows within the oral insert may change based on a location of the bristles within the oral insert. For example, the number of rows of bristles in a molar portion of the oral insert may be different than the number of rows of bristles in an incisor portion of the oral insert.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. An oral insert, comprising:
   a base that includes a plurality of manifold holes arranged in a circle;
   a plurality of bristles located on an upper portion and a lower portion of a tray surface of the oral insert;
   a plurality of fluid nozzles located at an inner portion and an outer portion of the tray surface; and
   a plurality of manifolds, wherein each of the plurality of manifolds is associated with a corresponding manifold hole of the plurality of manifold holes, wherein each manifold of the plurality of manifolds is associated with a corresponding subset of the plurality of fluid nozzles, wherein fluid is provided to the plurality of manifolds in a particular sequence that causes the oral insert to vibrate, wherein the vibration of the oral insert caused by fluid being provided to the plurality of manifolds in the particular sequence causes the plurality of bristles to contact surfaces of teeth associated with a user of the oral insert, wherein the particular sequence causes the fluid to be alternately provided between a left side and a right side of the oral insert, wherein the oral insert is configured to be connected to a handle, wherein the fluid is provided from the handle to the oral insert via the plurality of manifold holes, wherein the handle includes a manifold disc and a manifold disc selector, wherein the manifold disc selector includes an opening and a cut-out that is opposite the opening, wherein the cut-out extends only partially through the manifold disc selector, wherein the fluid is selectively provided to the plurality of manifolds via the plurality of manifold holes as the manifold disc selector rotates.

2. The oral insert of claim 1, wherein the plurality of fluid nozzles located at the inner portion of the tray surface are configured to output the fluid to interior surfaces of the user's teeth.

3. The oral insert of claim 1, wherein the plurality of fluid nozzles located at the outer portion of the tray surface are configured to output the fluid to exterior surfaces of the user's teeth.

4. The oral insert of claim 1, wherein the plurality of fluid nozzles are configured to be directed towards interproximal spaces associated with the user's teeth.

5. The oral insert of claim 1, wherein a material of the plurality of bristles is nylon or silicon.

6. The oral insert of claim 1, wherein the plurality of bristles are cilia-shaped bristles.

7. The oral insert of claim 1, wherein the plurality of bristles located on the upper portion and the lower portion of the tray surface of the oral insert are arranged in a plurality of rows.

8. The oral insert of claim 7, wherein the plurality of bristles arranged in the plurality of rows located on a bottom surface of the upper portion of the tray surface of the oral insert are configured to contact an exterior tooth surface, a bottom tooth surface, and an interior tooth surface of teeth associated with an upper jaw of the user.

9. The oral insert of claim 7, wherein the plurality of bristles arranged in the plurality of rows located on a top surface of the lower portion of the tray surface of the oral insert are configured to contact an exterior tooth surface, a top tooth surface, and an interior tooth surface of teeth associated with a lower jaw of the user.

10. The oral insert of claim 7, wherein a first bristle located in a first row of the plurality of rows is taller than a second bristle located in an intermediate row of the plurality of rows.

11. The oral insert of claim 10, wherein a third bristle located in a last row of the plurality of rows is taller than the second bristle located in the intermediate row of the plurality of rows.

12. The oral insert of claim 1, wherein a vibration of the oral insert causes the plurality of bristles to contact the surfaces of teeth associated with the user of the oral insert.

13. An oral insert, comprising:
a base that includes a plurality of manifold holes arranged in a circle;
a plurality of bristles located on an upper portion and a lower portion of a tray surface of the oral insert;
a plurality of fluid nozzles located at an inner portion and an outer portion of the tray surface; and
a plurality of manifolds, wherein each of the plurality of manifolds is associated with a corresponding manifold hole of the plurality of manifold holes, wherein each manifold of the plurality of manifolds is associated with a corresponding subset of the plurality of fluid nozzles, wherein fluid is provided to the plurality of manifolds in a particular sequence that causes the oral insert to vibrate, wherein the vibration of the oral insert caused by fluid being provided to the plurality of manifolds in the particular sequence causes the plurality of bristles to contact surfaces of teeth associated with a user of the oral insert, wherein the particular sequence causes the fluid to be successively provided to a left side and a right side of the oral insert, wherein the oral insert is configured to be connected to a handle, wherein the fluid is provided from the handle to the oral insert via the plurality of manifold holes, wherein the handle includes a manifold disc and a manifold disc selector, wherein the manifold disc selector includes an opening and a cut-out that is opposite the opening, wherein the cut-out extends only partially through the manifold disc selector, wherein the fluid is selectively provided to the plurality of manifolds via the plurality of manifold holes as the manifold disc selector rotates.

14. The oral insert of claim 1, wherein the base is configured to be inserted into a mouthpiece seal associated with the handle.

15. The oral insert of claim 14, wherein the handle is coupled to an oral health device base, the oral health device base is coupled to a fluid reservoir, wherein the fluid outputted by the plurality of fluid nozzles is provided from the fluid reservoir to the plurality of fluid nozzles via the handle and the plurality of manifolds.

16. The oral insert of claim 13, wherein the plurality of bristles located on the upper portion and the lower portion of the tray surface of the oral insert are arranged in a plurality of rows.

17. The oral insert of claim 16, wherein the plurality of bristles arranged in the plurality of rows located on a bottom surface of the upper portion of the tray surface of the oral insert are configured to contact an exterior tooth surface, a bottom tooth surface, and an interior tooth surface of teeth associated with an upper jaw of the user.

18. The oral insert of claim 16, wherein the plurality of bristles arranged in the plurality of rows located on a top surface of the lower portion of the tray surface of the oral insert are configured to contact an exterior tooth surface, a top tooth surface, and an interior tooth surface of teeth associated with a lower jaw of the user.

* * * * *